(12) United States Patent
Persi Del Marmo

(10) Patent No.: US 11,609,143 B2
(45) Date of Patent: Mar. 21, 2023

(54) METHOD FOR IDENTIFYING A LEAKAGE IN A CONDUIT IN WHICH A FLUID FLOWS AND SYSTEM THEREOF

(71) Applicant: Paolo Persi Del Marmo, Rome (IT)

(72) Inventor: Paolo Persi Del Marmo, Rome (IT)

(*) Notice: Subject to any disclaimer, the term of this patent is extended or adjusted under 35 U.S.C. 154(b) by 152 days.

(21) Appl. No.: 17/268,070

(22) PCT Filed: Aug. 13, 2019

(86) PCT No.: PCT/IT2019/050186
§ 371 (c)(1),
(2) Date: Feb. 11, 2021

(87) PCT Pub. No.: WO2020/035888
PCT Pub. Date: Feb. 20, 2020

(65) Prior Publication Data
US 2021/0181053 A1 Jun. 17, 2021

(30) Foreign Application Priority Data
Aug. 13, 2018 (IT) .................. 102018000008079

(51) Int. Cl.
*G01M 3/38* (2006.01)
*G01M 3/16* (2006.01)
*G06F 17/12* (2006.01)
*G06F 17/16* (2006.01)

(52) U.S. Cl.
CPC .............. *G01M 3/165* (2013.01); *G01M 3/38* (2013.01); *G06F 17/12* (2013.01); *G06F 17/16* (2013.01)

(58) Field of Classification Search
CPC ..................................................... G01M 3/38
See application file for complete search history.

(56) References Cited

U.S. PATENT DOCUMENTS

| 4,927,232 A | * | 5/1990 | Griffiths | .................. G01L 1/245 |
| | | | | 250/227.24 |
| 5,883,815 A | * | 3/1999 | Drakulich | ............. G01M 3/002 |
| | | | | 73/40 |
| 6,401,525 B1 | * | 6/2002 | Jamieson | .............. G01M 3/005 |
| | | | | 73/1.25 |
| 10,914,621 B2 | * | 2/2021 | Ainger | .................. G01L 11/025 |
| 2001/0030281 A1 | * | 10/2001 | Schulz | .................. G01M 3/165 |
| | | | | 250/227.21 |
| 2002/0041379 A1 | * | 4/2002 | Lin | ........................ G01M 3/047 |
| | | | | 356/483 |
| 2004/0264831 A1 | * | 12/2004 | Leppert | .................... G01M 3/38 |
| | | | | 385/12 |

(Continued)

OTHER PUBLICATIONS

International Search Report and Written Opinion for PCT/IT2019/050186 dated Nov. 21, 2019.

*Primary Examiner* — Alexander A Mercado
(74) *Attorney, Agent, or Firm* — Knobbe, Martens, Olson & Bear, LLP

(57) ABSTRACT

The present invention relates to a method for identifying a leakage in a conduit in which a fluid flows. Said method allows to identify a leakage in said conduit based on the mechanical deformation of a cable comprising inside at least one optical fiber, at a plurality of predetermined points of said cable, when said cable is arranged tensioned inside said conduit. The present invention also relates to a system for identifying a leakage in a conduit.

16 Claims, 13 Drawing Sheets

(56) References Cited

U.S. PATENT DOCUMENTS

| | | | |
|---|---|---|---|
| 2010/0269941 A1* | 10/2010 | Hara | F17D 5/06 |
| | | | 138/132 |
| 2011/0007996 A1* | 1/2011 | Huffman | G01M 5/0025 |
| | | | 385/12 |
| 2015/0285705 A1 | 10/2015 | Kumar et al. | |
| 2016/0266001 A1* | 9/2016 | Mcnab | G01M 3/182 |
| 2017/0276894 A1* | 9/2017 | Green | F16L 25/02 |
| 2021/0033485 A1* | 2/2021 | Dankers | E21B 47/135 |

* cited by examiner

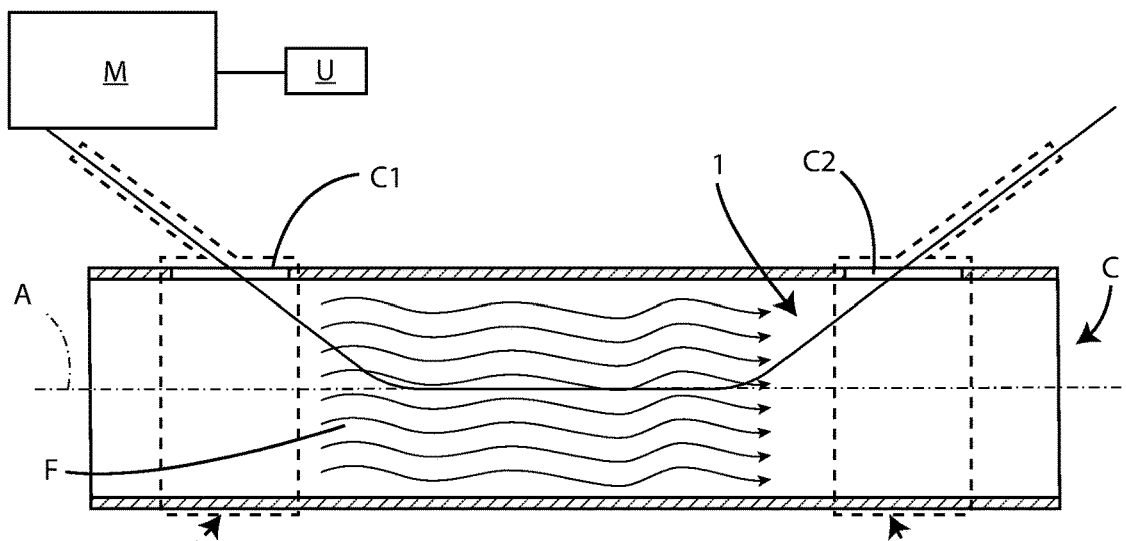

| Tempo | Deformazione in predeterminati punti del cavo | | | |
|---|---|---|---|---|
| $t_1$ | $(D_1)_1$ | $(D_2)_1$ | ... | $(D_N)_1$ |
| $t_2$ | $(D_1)_2$ | $(D_2)_2$ | ... | $(D_N)_2$ |
| ... | ... | ... | ... | ... |
| $t_M$ | $(D_1)_M$ | $(D_2)_M$ | ... | $(D_N)_M$ |

Fig. 3

| Tempo | Deformazione in predeterminati punti del cavo rispetto a predeterminati valori di riferimento | | | |
|---|---|---|---|---|
| $t_1$ | $(\Delta D_1)_1 = (D_1)_1 - D_{10}$ | $(\Delta D_2)_1 = (D_2)_1 - D_{20}$ | ... | $(\Delta D_N)_1 = (D_N)_1 - D_{N0}$ |
| $t_2$ | $(\Delta D_1)_2 = (D_1)_2 - D_{10}$ | $(\Delta D_2)_2 = (D_2)_2 - D_{20}$ | ... | $(\Delta D_N)_2 = (D_N)_2 - D_{N0}$ |
| ... | ... | ... | ... | ... |
| $t_M$ | $(\Delta D_1)_M = (D_1)_M - D_{10}$ | $(\Delta D_2)_M = (D_2)_M - D_{20}$ | ... | $(\Delta D_N)_M = (D_N)_M - D_{N0}$ |

Fig. 4

| Tempo | Differenza tra valori di deformazione associati a due predeterminati punti del cavo successivi | | | |
|---|---|---|---|---|
| $t_1$ | $\{\Delta(\Delta D_1)_1\} = (\Delta D_1)_1 - (\Delta D_2)_1$ | $\{\Delta(\Delta D_2)_1\} = (\Delta D_2)_1 - (\Delta D_3)_1$ | ... | $\{\Delta(\Delta D_N)_1\} = (\Delta D_{N-1})_1 - (\Delta D_N)_1$ |
| $t_2$ | $\{\Delta(\Delta D_1)_2\} = (\Delta D_1)_2 - (\Delta D_2)_2$ | $\{\Delta(\Delta D_2)_2\} = (\Delta D_2)_2 - (\Delta D_3)_2$ | ... | $\{\Delta(\Delta D_N)_2\} = (\Delta D_{N-1})_2 - (\Delta D_N)_2$ |
| ... | ... | ... | ... | ... |
| $t_M$ | $\{\Delta(\Delta D_1)_M\} = (\Delta D_1)_M - (\Delta D_2)_M$ | $\{\Delta(\Delta D_2)_M\} = (\Delta D_2)_M - (\Delta D_3)_M$ | ... | $\{\Delta(\Delta D_N)_M\} = (\Delta D_{N-1})_M - (\Delta D_N)_M$ |

Fig. 5

METHOD FOR IDENTIFYING A LEAKAGE IN A CONDUIT IN WHICH A FLUID FLOWS AND SYSTEM THEREOF

The present invention relates to a method for identifying a leakage in a conduit in which a fluid flows.

In particular, said method is conceived to identify a leakage inside a conduit, based on the mechanical deformations to which a cable comprising inside at least one optical fiber, inside a conduit, is subjected.

For example, the fluid that can flow in the conduit can be water, gas or oil.

As a result, the leakage can be a water leakage or a gas leakage or an oil leakage.

PRIOR ART

Several methods are known for identifying a leakage in a conduit in which a fluid flows.

For example, methods are known for identifying the location of a leakage of a fluid in a conduit.

A first method of the type known for the localization of a leakage of fluid in a conduit is based on the use of a geophone capable of transforming the noises of water leakage into sounds audible to the human ear.

This is due to the fact that, in the points of the conduit where a leakage is located, it is possible to have a certain noise due to the fluid that generates a sound of known frequencies due to the friction of the fluid itself with the walls of the slot from which it comes out.

Moreover, the same water leakage generates vibrations of the tube which in turn generate a specific noise.

In particular, the vibrations generated by the outflow of the fluid from a conduit (which can be buried or inside walls) are transformed by the geophone into sounds having a respective intensity.

The use of the geophone allows to identify the path of a fluid and identify any outflow of said fluid in the conduit in which it flows.

A first drawback of said known method is that this technique works only if the fluid flowing inside the conduit is a pressurized fluid.

A further drawback is to distinguish in a correct manner the noise generated by the turbulence of the fluid flowing in the conduit from the noise generated by the fluid coming out from the conduit due to a leakage and/or from the environmental noise.

A second method of the known type for the localization of water leakages is based on the use of flow rate meters for measuring the flow rate of a fluid, arranged in respective positions, to control the correct functionality of the entire water network.

A first drawback is the fact that the installation of flow rate meters along the entire water network requires a connection structure to connect said flow rate meters to the water network, as well as supply power means for supplying power to said flow rate meters and transmission means for transmitting data to a processing unit.

Both of the methods mentioned above have drawbacks in common.

In each method, the measurement is a punctual type measurement and is not a measure distributed along the entire conduit. As a result, each method is a method that can hardly be a fully automated method.

Moreover, each method is not capable of identifying the position of the leakage with a high accuracy, nor is capable of defining the extent of the leakage.

AIM OF THE INVENTION

The aim of the present invention is to overcome said disadvantages, providing a method for identifying a leakage in a conduit in which a fluid flows as a function of the mechanical deformation of a plurality of points of a cable comprising inside at least an optical fiber, when said cable is arranged tensioned inside said conduit.

This is due to the fact that the optical fiber is subject to the same deformation as the cable.

Consequently, at the points where the cable is subjected to deformation, the optical fiber is also subjected to deformation.

OBJECT OF THE INVENTION

It is therefore object of the invention a method for identifying a leakage in a conduit in which a fluid flows, where said method comprises the following steps:

A) providing a cable comprising inside at least one first optical fiber, where said cable comprises an inner surface and has a longitudinal axis and said first optical fiber is integral with a portion of said inner surface of said cable, B) arranging said cable tensioned inside said conduit in such a way that the longitudinal axis of said cable is coincident or substantially coincident with or parallel or substantially parallel to the longitudinal axis of said conduit, in such a way that, in use, said cable is inside the fluid present in said conduit (C), C) for each instant time $t_K$, with $k=1, \ldots, M$ where M is a positive integer and k is the index of the number of time instants, measuring the value of mechanical deformation at predetermined points $P_i$ of said cable, with $i=1, \ldots, N$ where N is a positive integer and i is the index of the number of said predetermined points, so as to obtains a succession of values of mechanical deformation $(D_i)_k$ for each of said predetermined points $P_i$ at each time instant $t_K$:

at the time instant $t_1$
$(D_1)_1, (D_2)_1 \ldots (D_N)_1$
at the time instant $t_2$
$(D_1)_2, (D_2)_2 \ldots (D_N)_2$
$\ldots$
at the time instant $t_M$
$(D_1)_M, (D_2)_M \ldots (D_N)_M$ D) for each time instant $t_K$, calculating the difference between the value of mechanical deformation $(D_i)_k$ at a predetermined point $P_i$ of said cable and a respective predetermined reference value of mechanical deformation $D_{10}$, $D_{20} \ldots D_{N0}$ at the same predetermined point $P_i$, so as to obtain for each time instant $t_k$ a respective first succession of difference values $(\Delta D_i)_k$ at the time instant $t_1$
$(\Delta D_1)_1, (\Delta D_2)_1 \ldots (\Delta D_N)_1$
where
$(\Delta D_1)_1 = (D_1)_1 - D_{10}$
$(\Delta D_2)_1 = (D_2)_1 - D_{20}$
$\ldots$
$(\Delta D_N)_1 = (D_N)_1 - D_{N0}$
at the time instant $t_2$
$(\Delta D_1)_2, (\Delta D_2)_2 \ldots (\Delta D_N)_2$
where
$(\Delta D_1)_2 = (D_1)_2 - D_{10}$
$(\Delta D_2)_2 = (D_2)_2 - D_{20}$ ...
$(\Delta D_N)_2 = (D_N)_2 - D_{N0}$
...
at the time instant $t_M$
$(\Delta D_1)_2, (\Delta D_2)_2 \ldots (\Delta D_N)_2$
where
$(\Delta D_1)_M = (D_1)_M - D_{10}$
$(\Delta D_2)_M = (D_2)_M - D_{20}$
...
$(\Delta D_N)_M = (D_N)_M - D_{N0}$ E) for each time instant $t_K$, comparing each difference value of a respective succession of difference values $(\Delta D_i)_k$ with the subsequent difference value $(\Delta D_{i+1})_k$ of said respective succession of difference values, so as to obtain a respective second succession of difference values $\{\Delta(\Delta D_i)_k\}$:

at the time instant $t_1$
$\{\Delta(\Delta D_1)_1\}, \{\Delta(\Delta D_2)_1\} \ldots \{\Delta(\Delta D_N)_1\}$
where
$\{\Delta(\Delta D_1)_1\} = (\Delta D_1)_1 - (\Delta D_2)_1,$
$\{\Delta(\Delta D_2)_1\} = (\Delta D_2)_1 - (\Delta D_3)_1,$
$\{\Delta(\Delta D_3)_1\} = (\Delta D_3)_1 - (\Delta D_4)_1,$
...
$\{\Delta(\Delta D_N)_1\} = (\Delta D_{N-1})_1 - (\Delta D_N)_1$ at the time instant $t_2$
$\{\Delta(\Delta D_1)_2\}, \{\Delta(\Delta D_2)_2\} \ldots \{\Delta(\Delta D_N)_2\}$
where
$\{\Delta(\Delta D_1)_2\} = (\Delta D_1)_2 - (\Delta D_2)_2,$
$\{\Delta(\Delta D_2)_2\} = (\Delta D_2)_2 - (\Delta D_3)_2,$
$\{\Delta(\Delta D_3)_2\} = (\Delta D_3)_2 - (\Delta D_4)_2,$
...
$\{\Delta(\Delta D_N)_2\} = (\Delta D_{N-1})_2 - (\Delta D_N)_2$
...

at the time instant $t_M$
$\{\Delta(\Delta D_1)_M\}, \{\Delta(\Delta D_2)_M\} \ldots \{\Delta(\Delta D_N)_M\}$
where
$\{\Delta(\Delta D_1)_M\} = (\Delta D_2)_M - (\Delta D_2)_M,$
$\{\Delta(\Delta D_2)_M\} = (\Delta D_2)_M - (\Delta D_3)_M,$
$\{\Delta(\Delta D_3)_M\} = (\Delta D_3)_M - (\Delta D_4)_M,$
...
$\{\Delta(\Delta D_N)_M\} = (\Delta D_{N-1})_M - (\Delta D_N)_M$ F) for each time instant $t_K$, verifying if the difference value $\{\Delta(\Delta D_i)_K\}$ of each second succession of difference values is greater than 0 for determining if an amount of fluid (F) comes out from said conduit between two predetermined points of said conduit, G) for each couple of predetermined points of said cable at the difference value $\{\Delta(\Delta D_i)_K\}$ of each second succession is greater than 0, in order to determine if said amount of fluid comes out from said conduit due to a leakage, verifying:

when the value of mechanical deformation $(\Delta D_i)_{k+1}$ at a time instant $t_{K+1}$ is equal to the value of the mechanical deformation $(\Delta D_i)_k$ at the time instant $t_K$, if the value of difference between the difference value $\{\Delta(\Delta D_i)_K\}$ between two predetermined points at the time instant $t_K$ and the difference value $\{\Delta(\Delta D_i)_{K+1}\}$ between the same predetermined points at the time instant $t_{K+1}$ is less than or equal to 0, when the value of mechanical deformation $(\Delta D_i)_{k+1}$ at a time instant $t_{K+1}$ is different from the value of mechanical deformation $(\Delta D_i)_k$ at the time instant $t_K$, if the value of the difference between the difference value $\{\Delta(\Delta D_i)_K\}$ between two predetermined points at the time instant K and the difference value $\{\Delta(\Delta D_i)_{K+1}\}$ between the same predetermined points at the time instant K+1 multiplied for the ratio between the value of mechanical deformation $(\Delta D_i)_k$ at the time $t_K$ and the value of mechanical deformation $(\Delta D_i)_{k+1}$ at the time instant $t_{K+1}$ is less than or equal to 0.

Further embodiments of such a method are disclosed in the dependent claims.

It is therefore also object of the invention a system for identifying a leakage in a conduit in which a fluid flows, comprising:

a cable comprising inside at least one first optical fiber, where said cable comprises an inner surface and has a longitudinal axis and said first optical fiber is integral with a portion of said inner surface of said cable;

an optical interrogator machine for interrogating said at least one first optical fiber, where said optical interrogator machine is provided with at least one input for receiving an end of said cable, a control logic unit configured to perform the steps from C to G of the method above mentioned, a first sealing device having a longitudinal axis and shaped to be adapted to the conduit in such a way that, in use, said first sealing device is positioned around a first portion of said conduit and its longitudinal axis is coincident or substantially coincident with the longitudinal axis of said conduit (C), a second sealing device having a longitudinal axis and shaped to be adapted to the conduit, in such a way that, in use, said second sealing device is positioned around a second portion of said conduit, spaced from said first portion, and its longitudinal axis is coincident or substantially coincident with the longitudinal axis of said conduit, a first positioning device and a second positioning device for positioning said cable inside said conduit, where said first sealing device comprises a first channel for the passage of at least a cable, said first channel having an inlet and an outlet and being arranged around a first axis inclined with respect to a first transverse plane of said first sealing device in such a way that said first channel forms with the longitudinal axis of said first sealing device a first angle between 5° and 45°, preferably 30°, said second sealing device comprises a further first channel for the passage of at least a cable, said further first channel having an inlet and an outlet and being arranged around a further first axis inclined with respect to a second transverse plane of said second sealing device, different from said first transverse plane, in such a way that said further first channel forms with the longitudinal axis of said second sealing device a further first angle between 5° and 45°, preferably 30°, said first channel and said further first channel have an inclination equal or substantially equal and opposite with respect to a transverse plane of said conduit, each positioning device comprises:

a respective body having a respective part configured to be coupled respectively to the inlet of the first channel of the first sealing device and to the inlet of the further first channel of the second sealing device, a respective sealing element arranged on the respective body, a hollow element arranged at least partially inside the respective body and sliding with respect to said body, where the hollow element of the first positioning device has a length such that, in use, substantially extends from the inlet of the first channel of the first sealing device inside the conduit, up to an axis being coincident or substantially coincident with or parallel or substantially parallel to the longitudinal axis of said conduit, and the hollow element of the second positioning device has a length such that, in use, substantially extends from the inlet of the further first channel of the second sealing device inside the conduit, up to an axis coincident or substantially coincident with or parallel or substantially parallel to the axis longitudinal of said conduit.

Further embodiments of such a system are disclosed in the dependent claims.

LIST OF THE ATTACHED FIGURES

The present invention will be now described, for illustrative, but not limitative purposes, according to its embodiment, making particular reference to the enclosed figures, wherein:

FIG. 1 is a schematic view of a cable comprising inside at least one optical fiber, arranged inside a water conduit, where said cable is connected to an optical interrogation machine to interrogate said at least one optical fiber, according to the method object invention;

FIG. 2 shows a detail concerning a portion of the cable of FIG. 1;

FIG. 3 is a table showing the mechanical deformation values of the cable of FIG. 1 in predetermined points of the cable itself over time;

FIG. 4 is a table showing a respective first sequence of difference values over time, where each difference value is given by the difference between the value of mechanical deformation at predetermined points of the cable with respect to predetermined reference values of mechanical reference deformation at the same points;

FIG. 5 is a table showing a respective second sequence of difference values over time, where each difference value is given by the difference between the difference values of FIG. 4 associated with two predetermined points of the cable, arranged in succession;

FIG. 9 shows the insertion of a pilot probe or pilot cable inside a water conduit, FIG. 10 shows the cable provided with optical fiber connected to the pilot probe, FIG. 11 shows the cable provided with optical fiber that enters the water conduit and exits from the water conduit itself;

Figure 11:
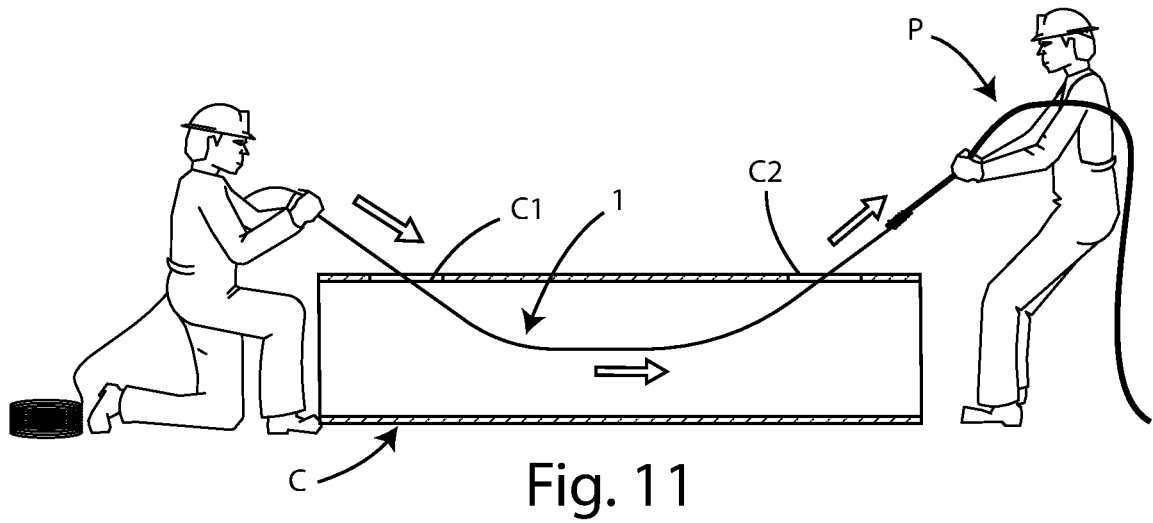
Figure 12:
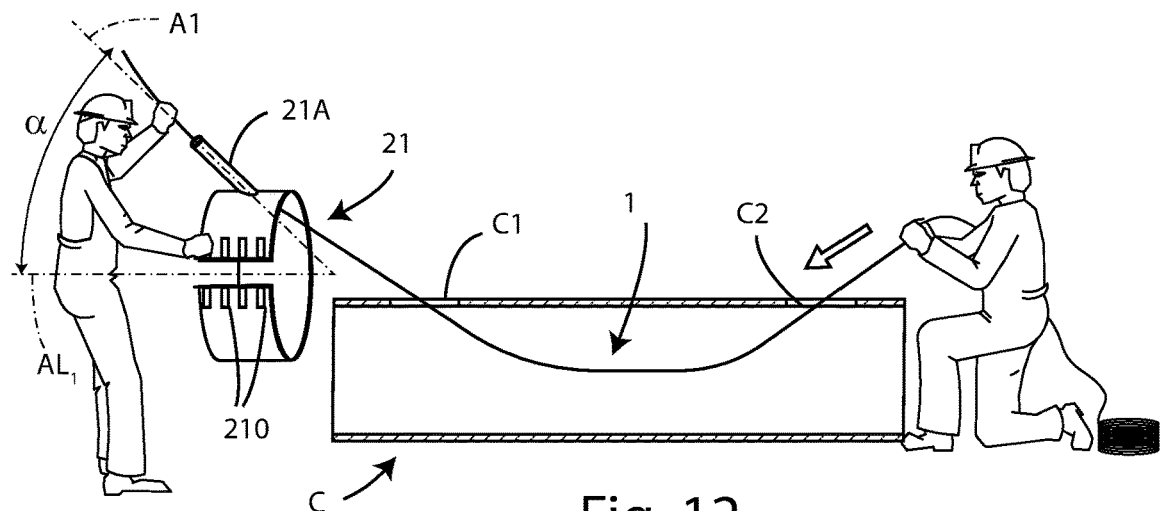
Figure 13:
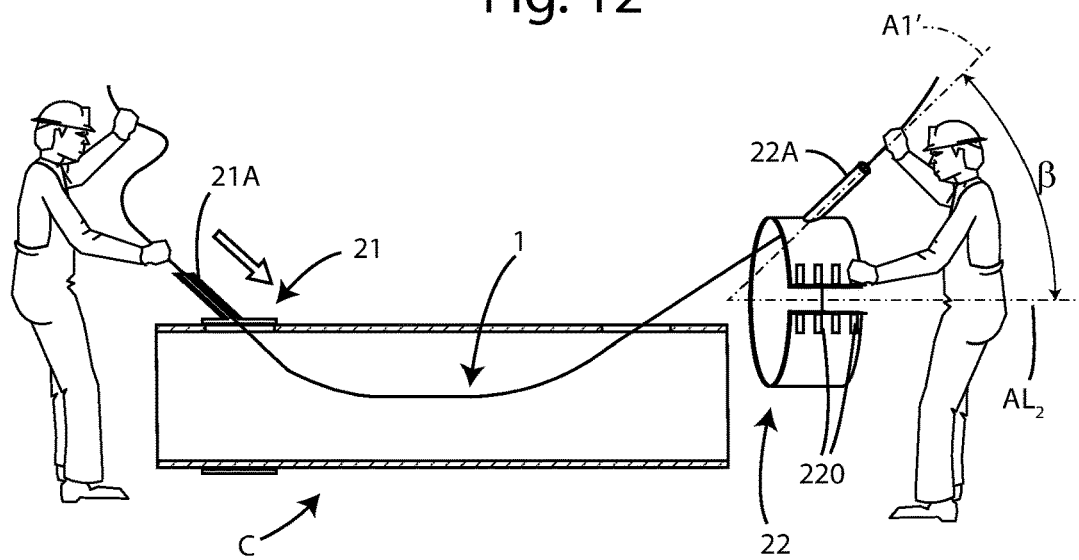
Figure 14:
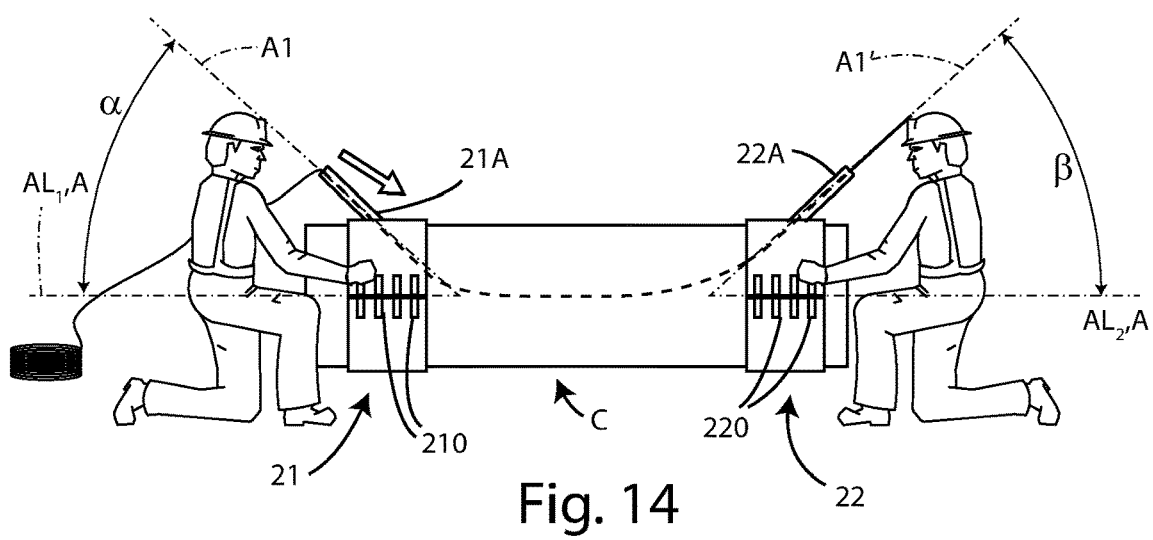
Figure 15:
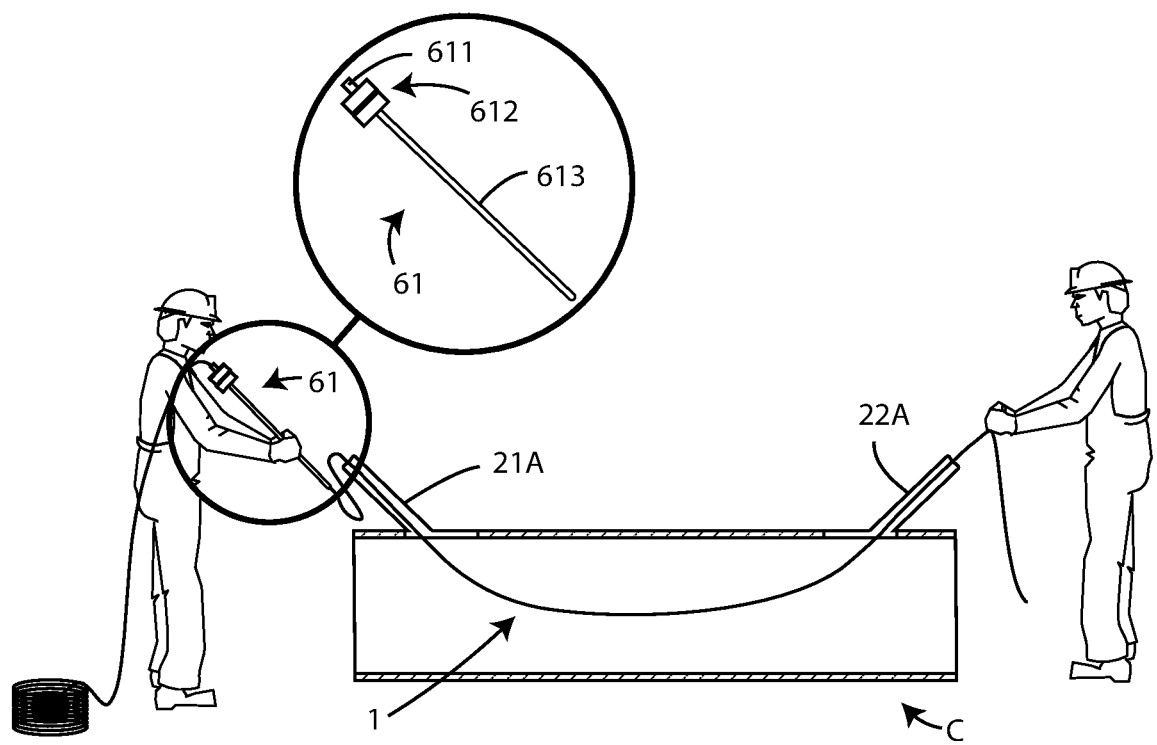
Figure 16:
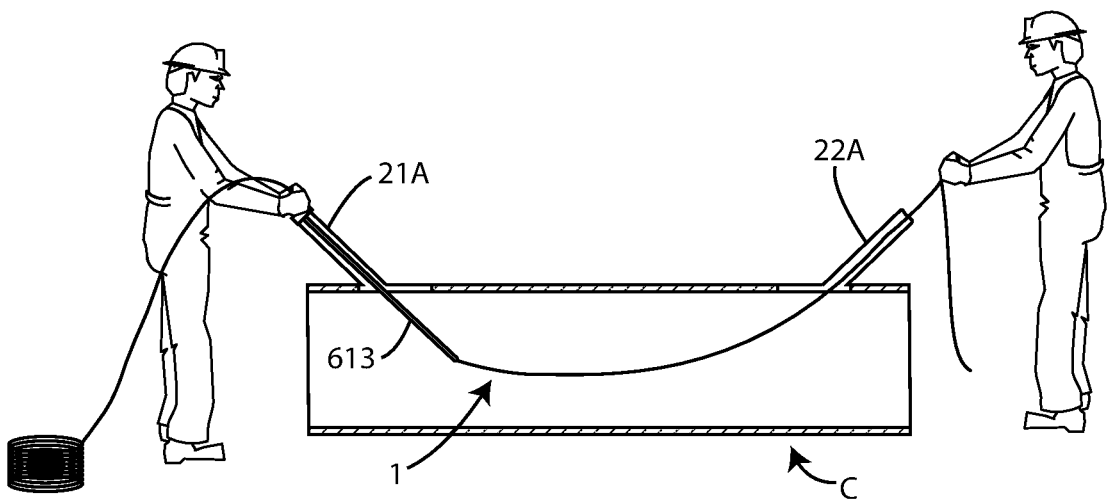
Figure 17:
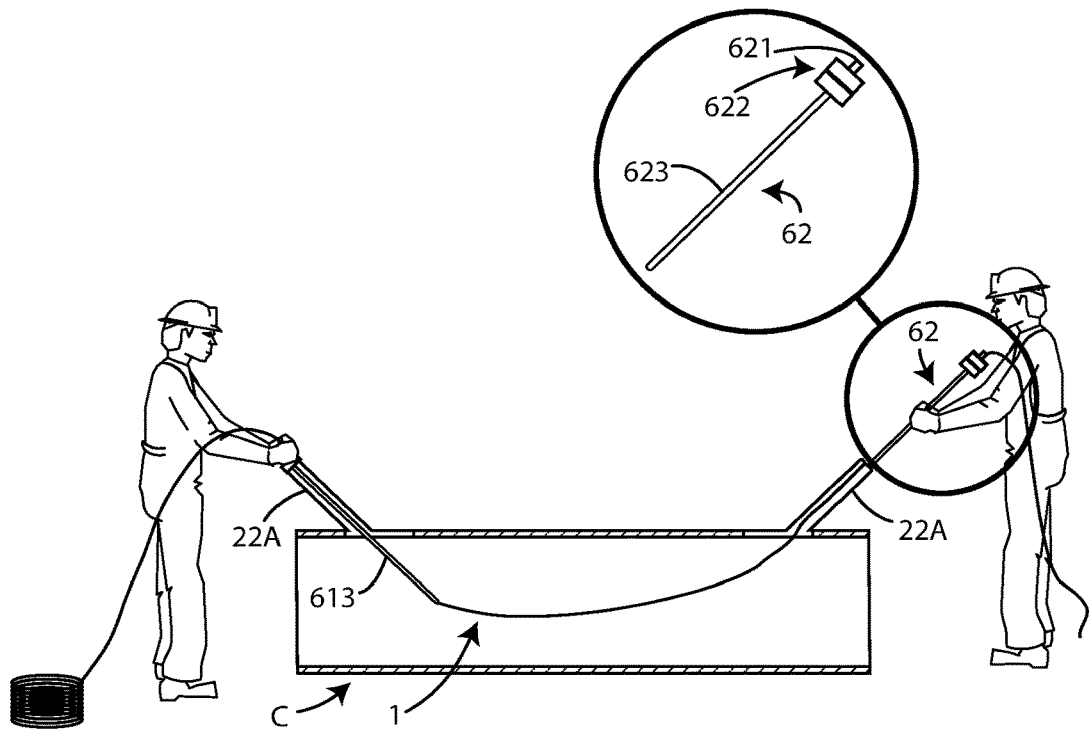
Figure 18:
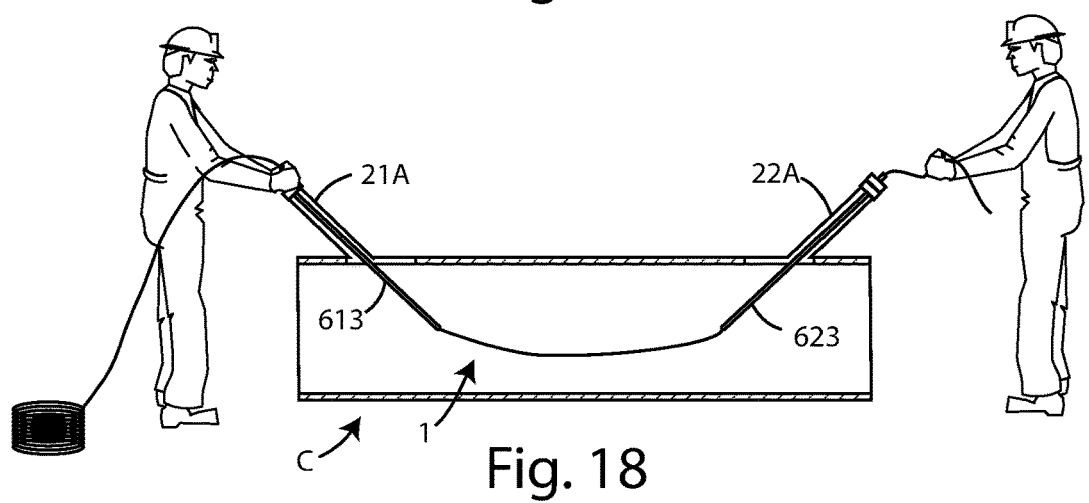
Figure 19:
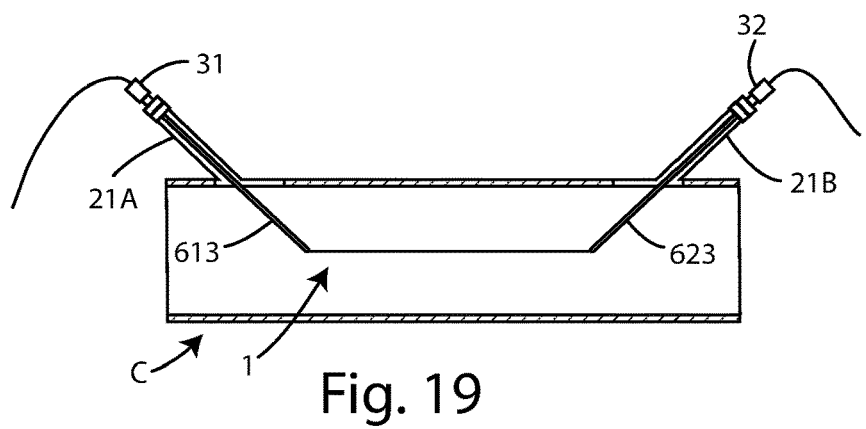
Figure 20A:
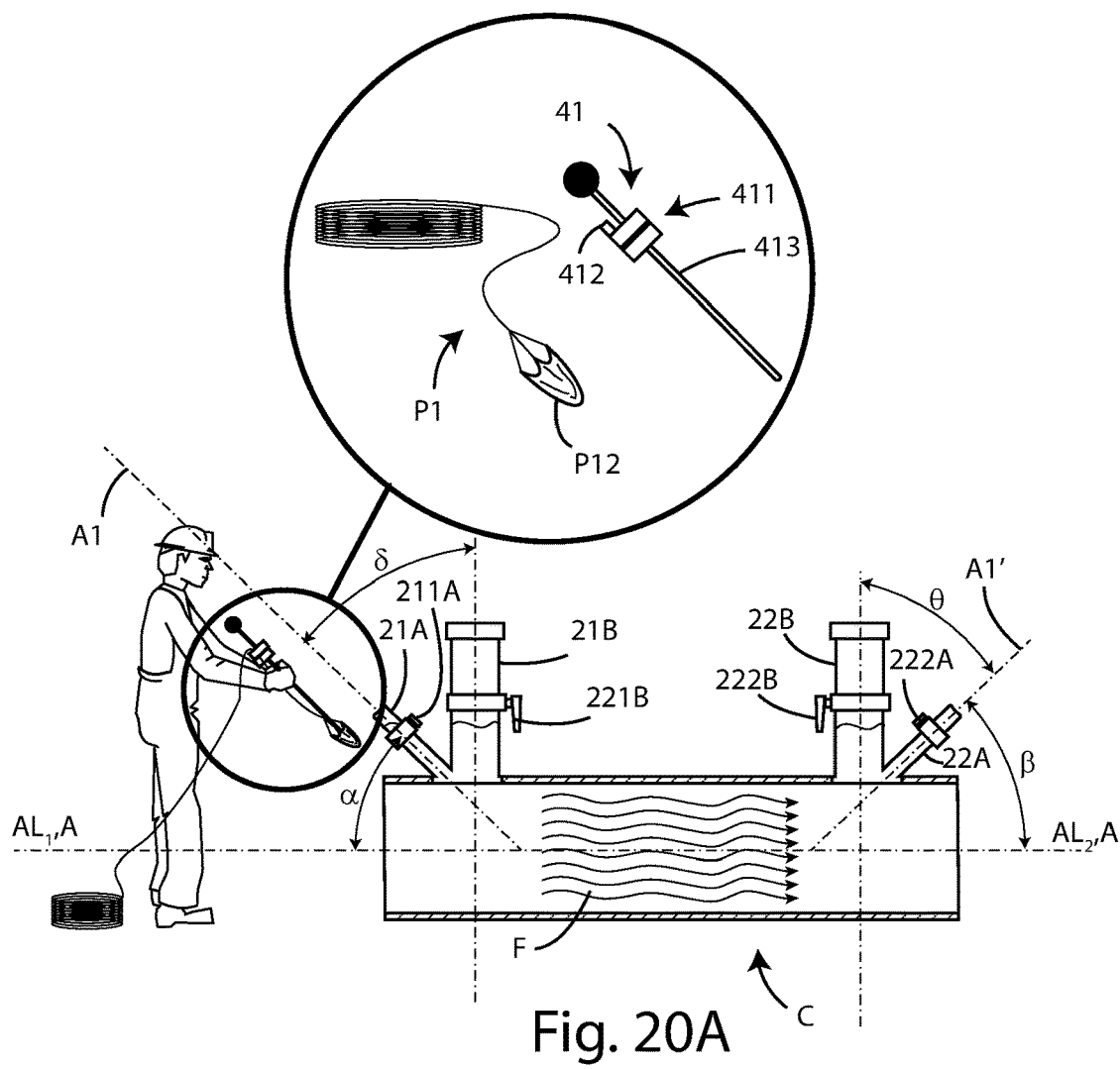
Figure 20B:
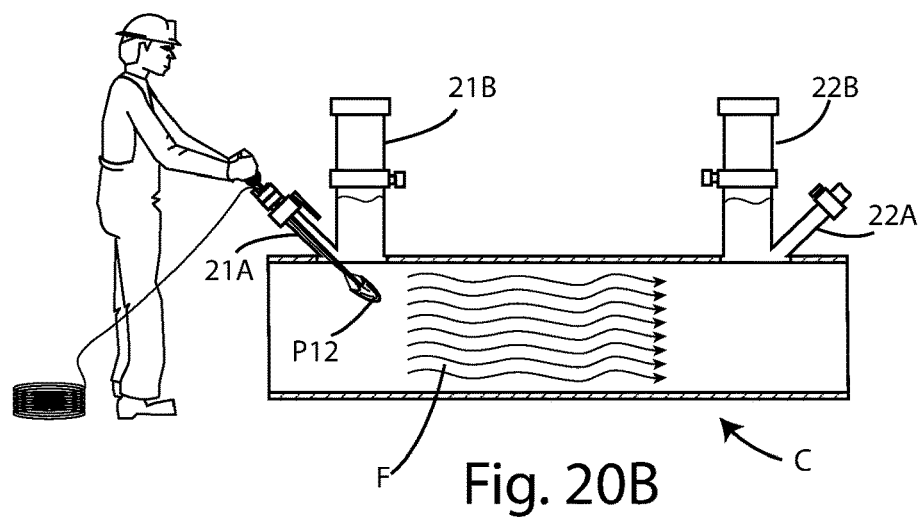
Figure 20C:
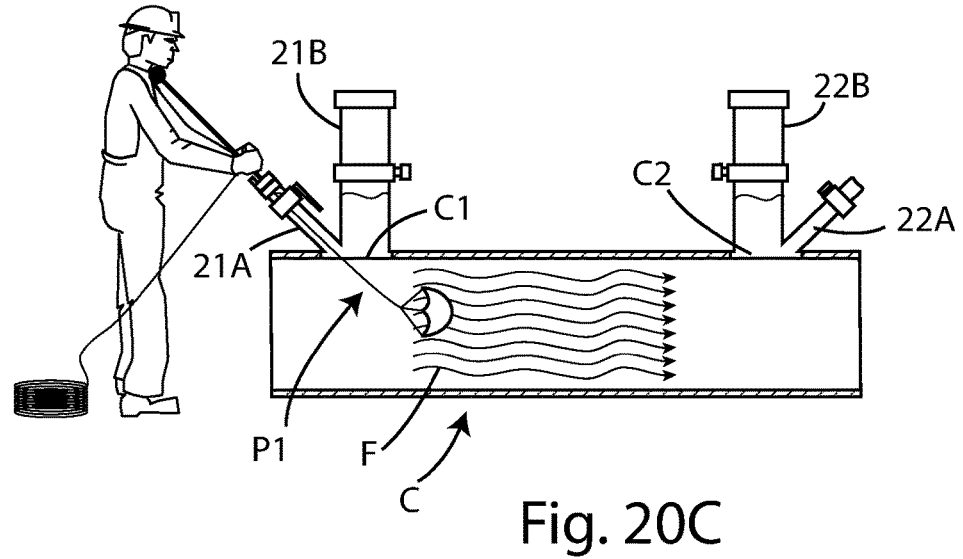
Figure 21A:
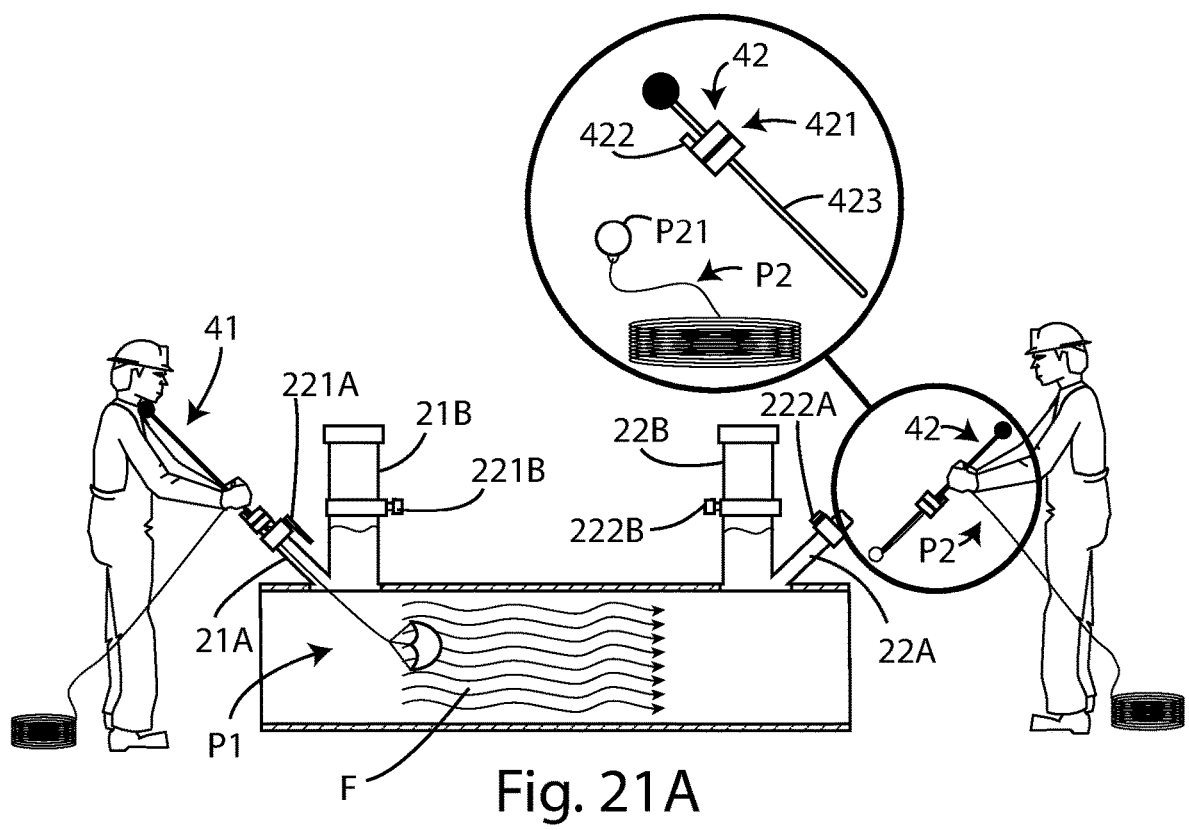
Figure 21B:
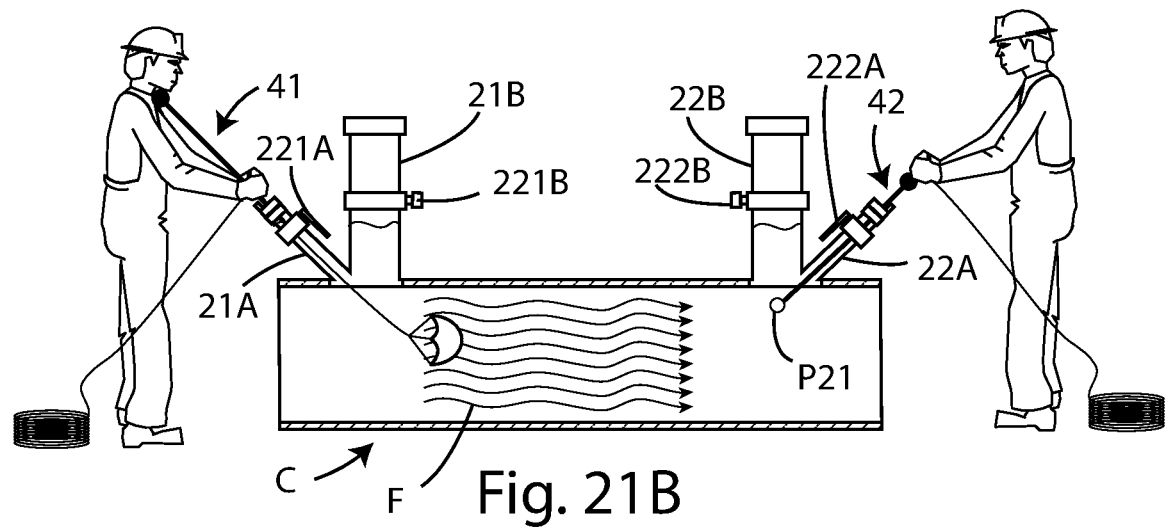
Figure 21C:
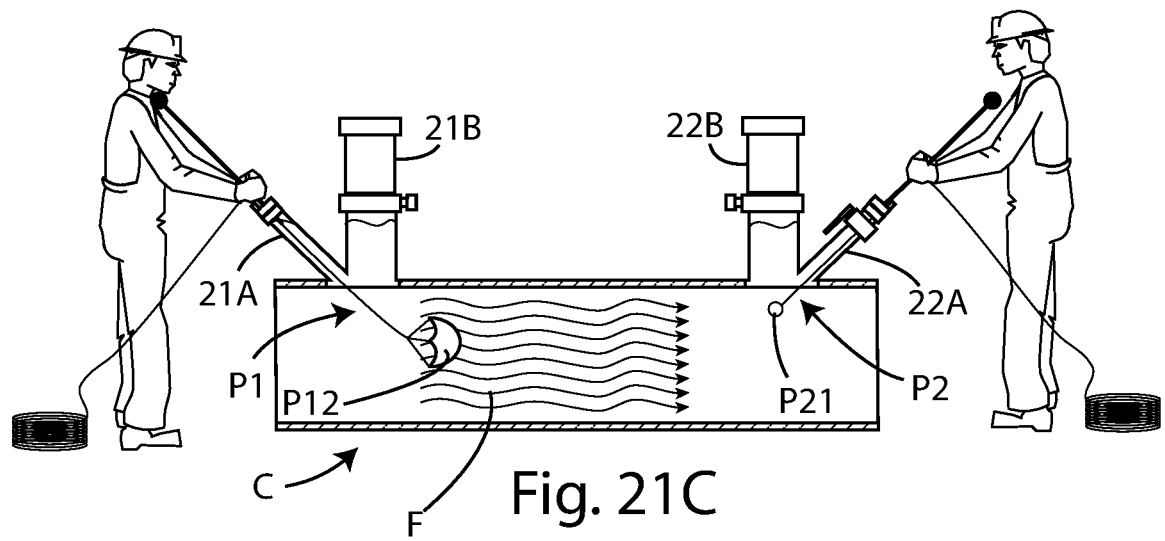
Figure 21D:
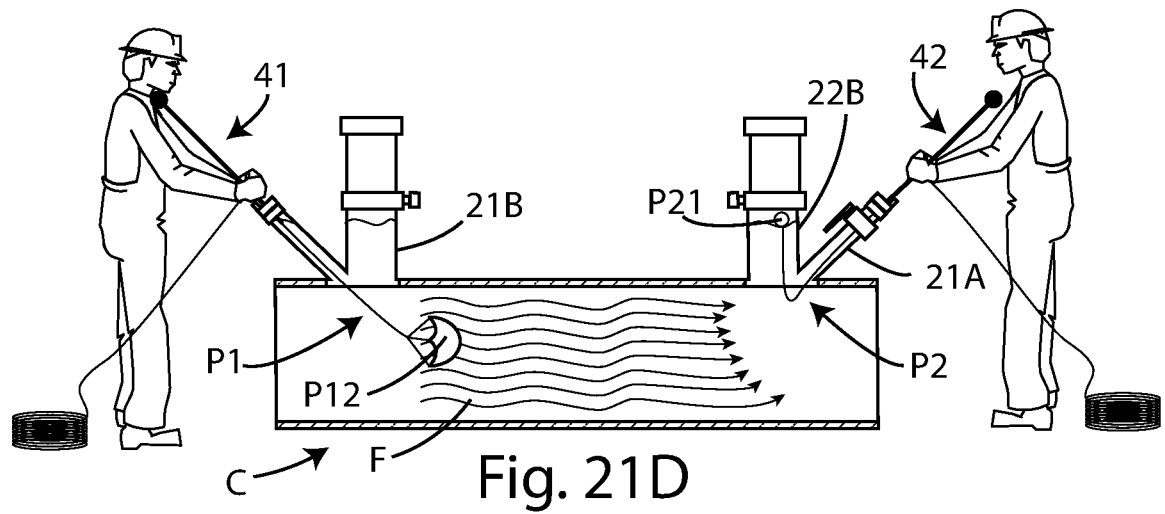
Figure 22:
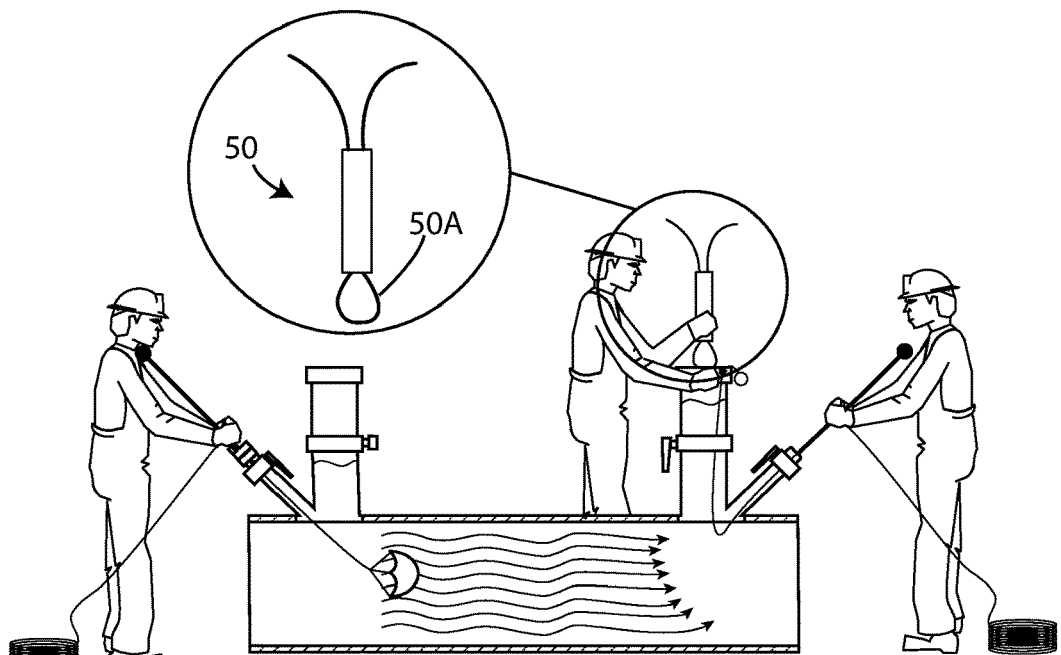
Figure 23:
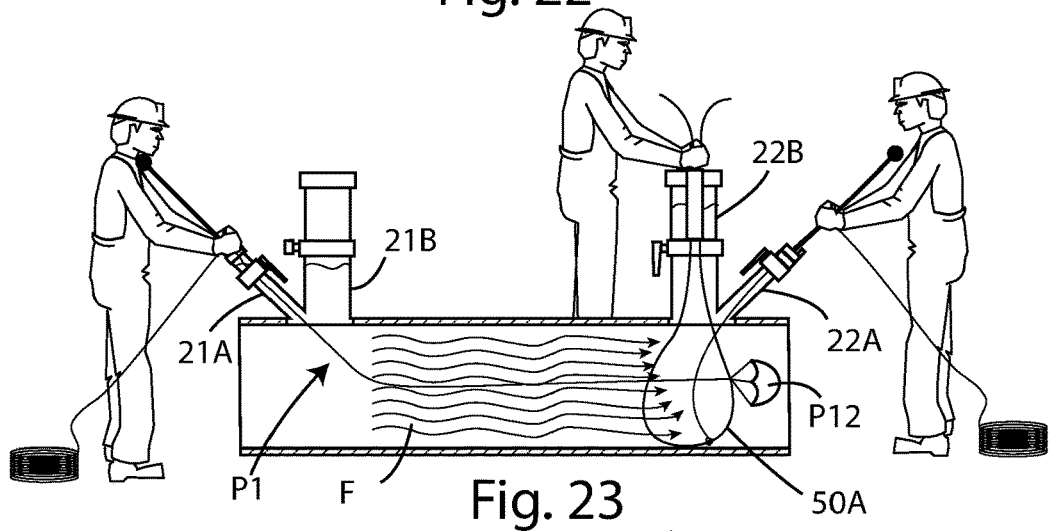
Figure 24:
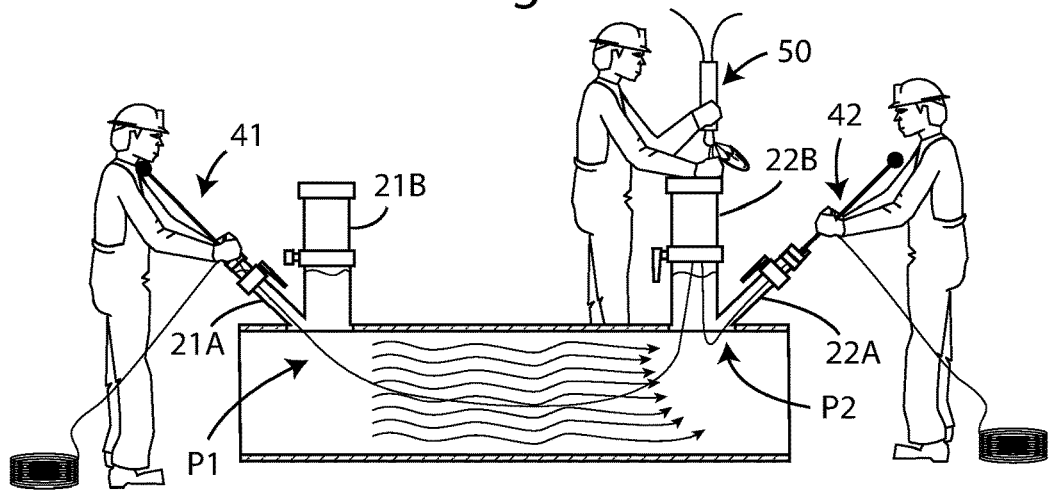
Figure 25:
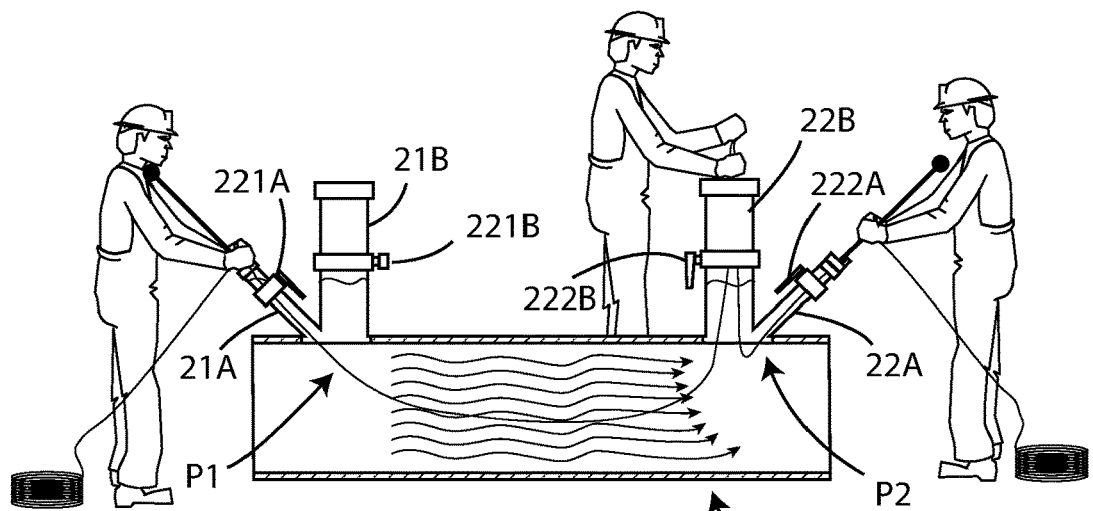
Figure 26:
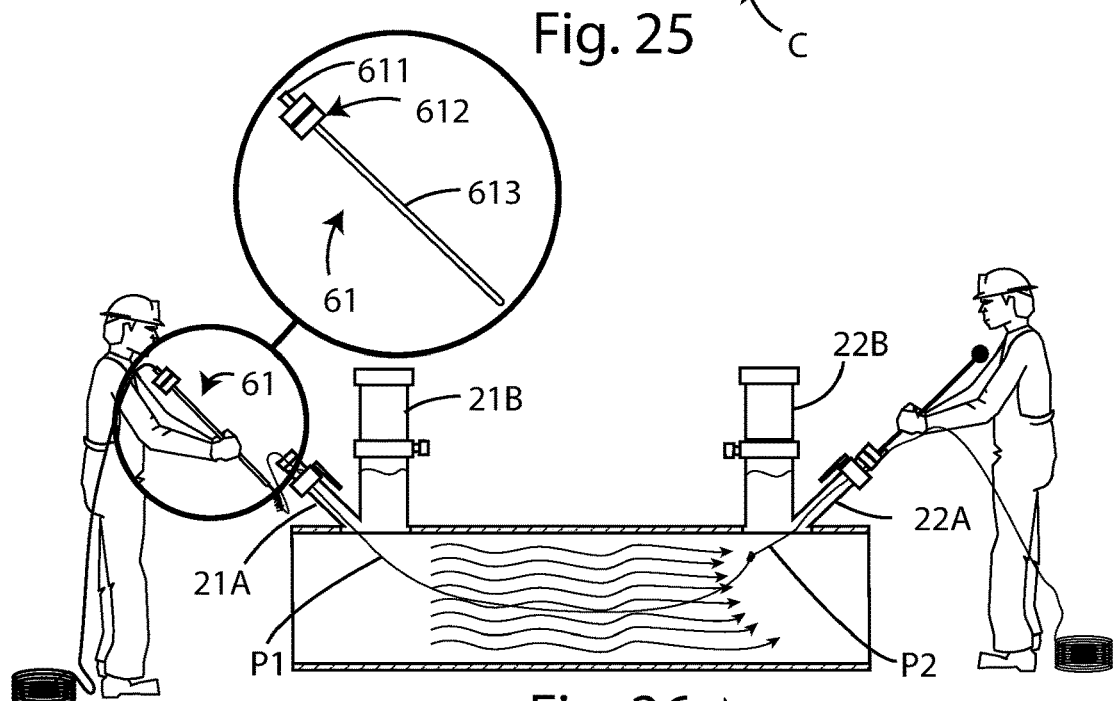
Figure 27:
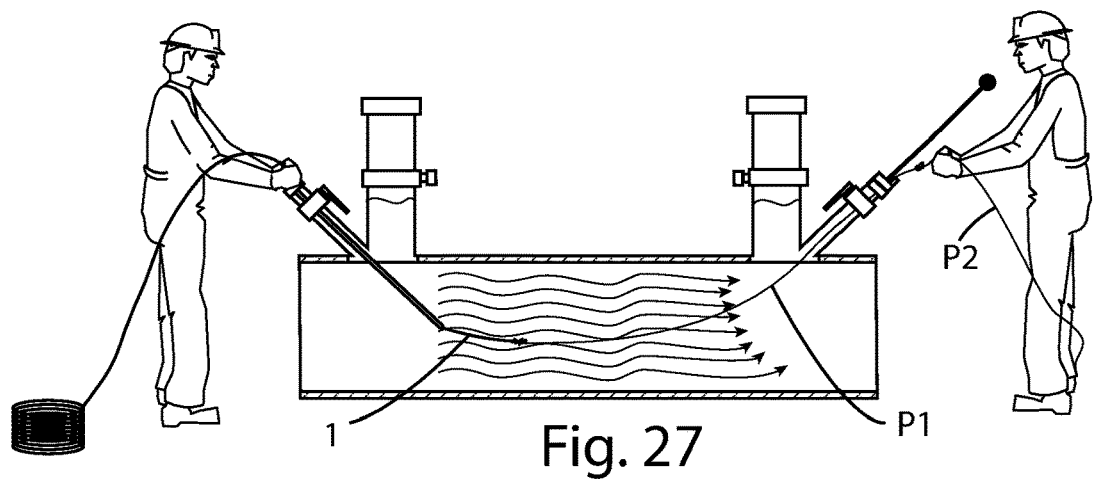
Figure 28:
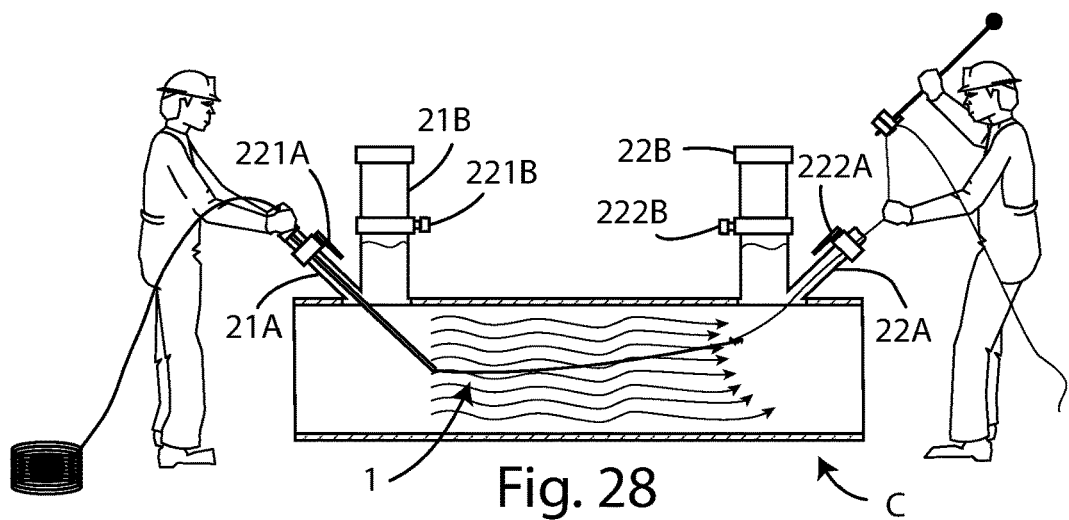
Figure 29:
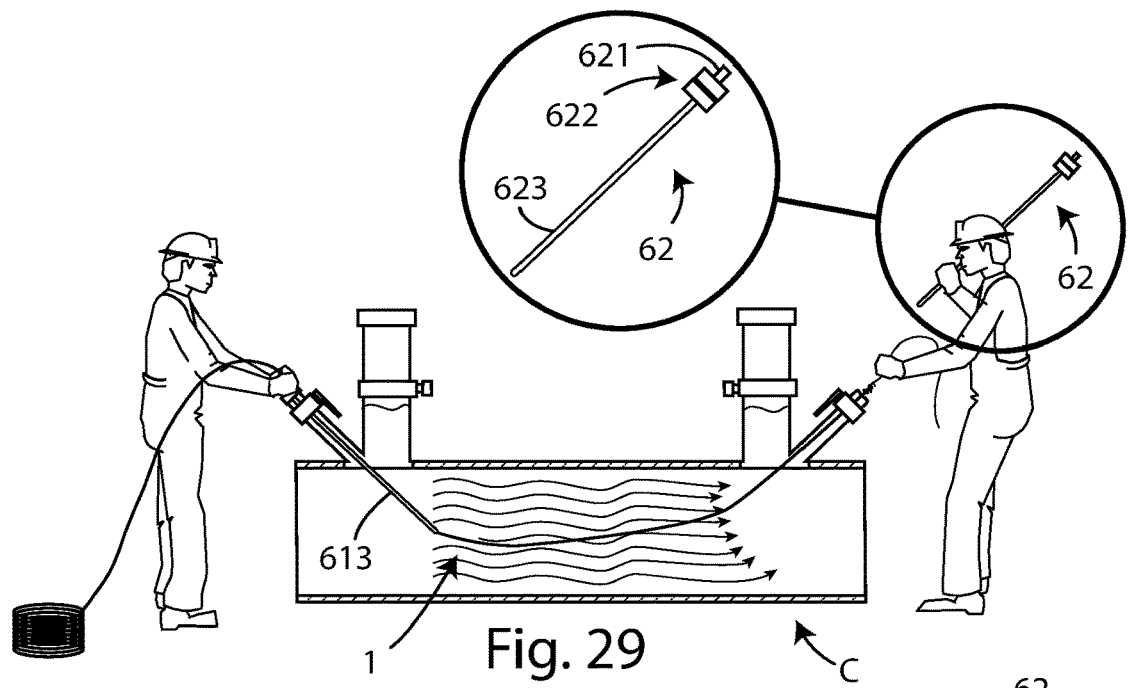
Figure 30:
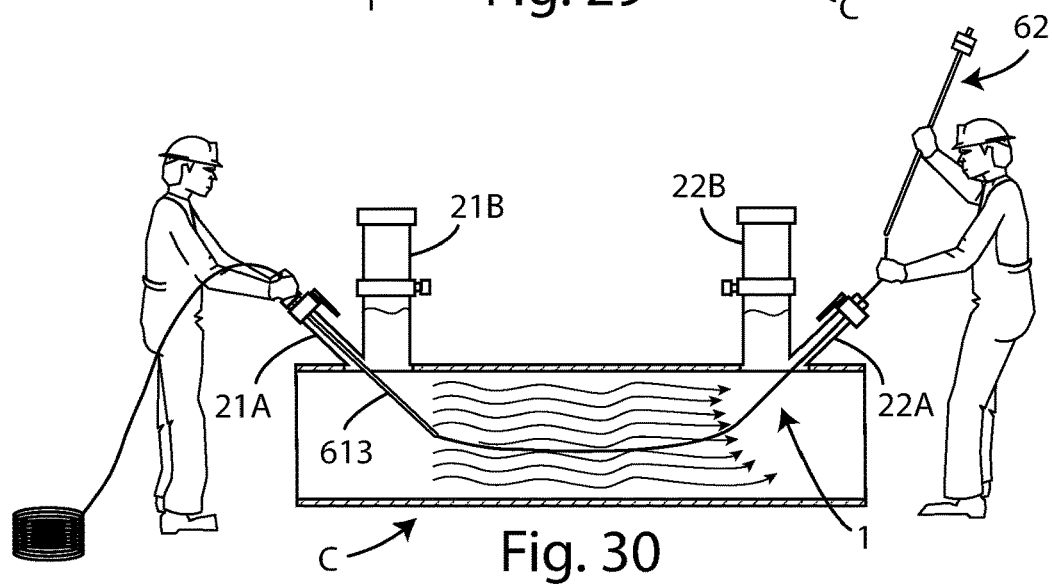
Figure 31:
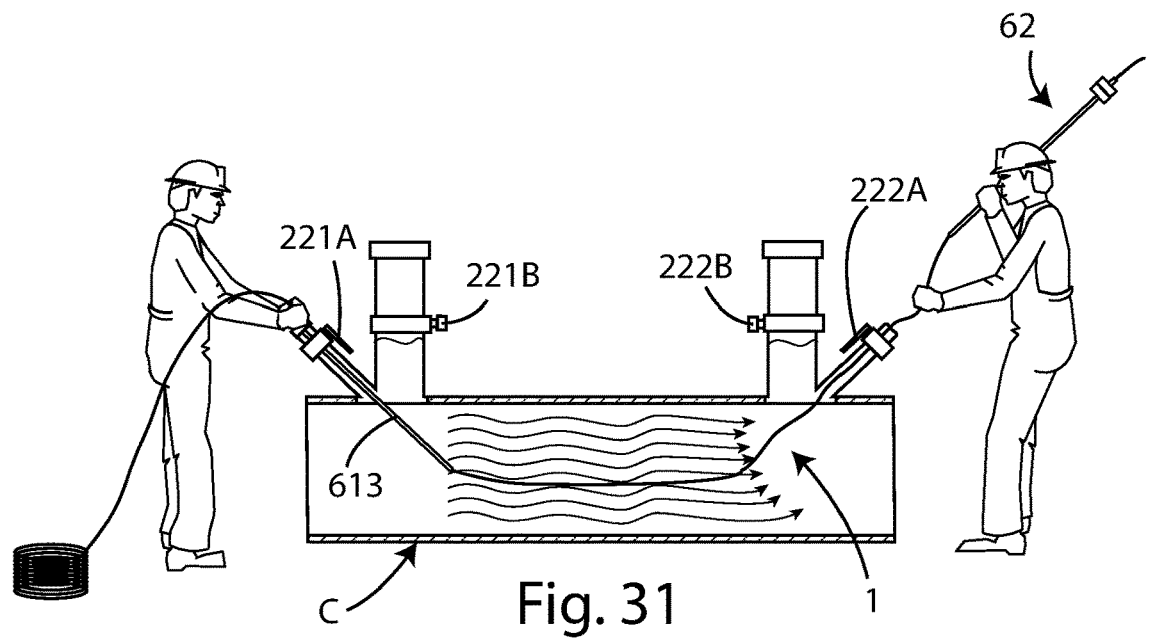
Figure 32:
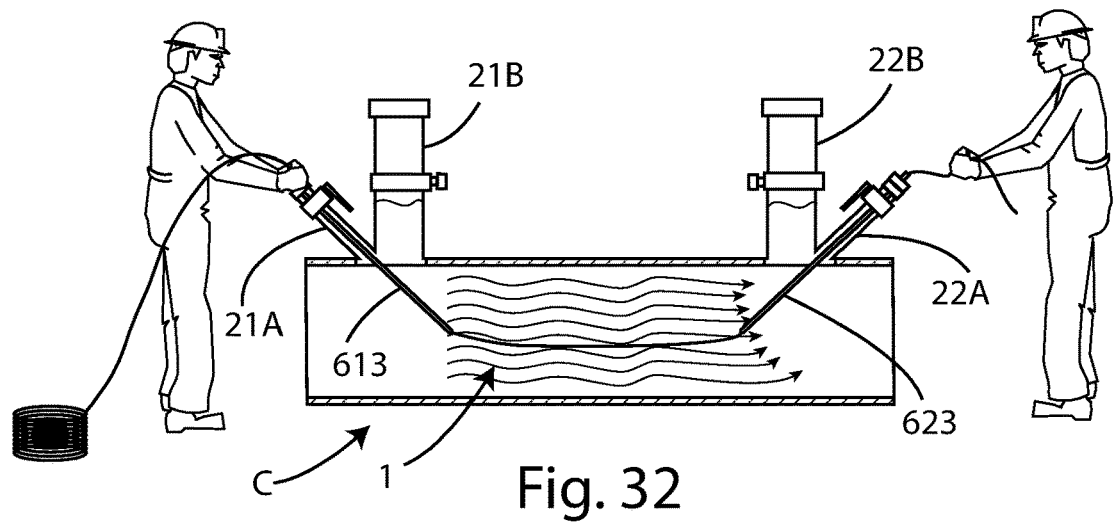
Figure 33:
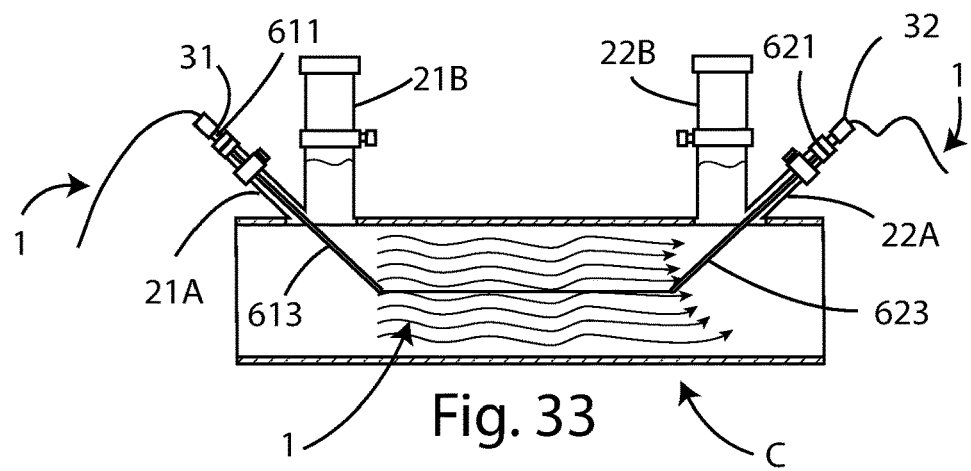

FIG. 12 shows a portion of the cable provided with optical fiber inserted in a first sealing device to be applied on said water conduit, FIG. 13 shows the first sealing device of FIG. 11 applied on the conduit and a further portion of the cable provided with optical fiber inserted in a second sealing device to be applied on said water conduit, FIG. 14 shows the water conduit on which the first sealing device and the second sealing device have been applied and the cable provided with optical fiber inside the conduit with a portion external to the first sealing device and a further portion external to the second sealing device, FIG. 15 shows the pilot probe inside the water conduit with a first end external to the first channel of the first sealing device, to which the cable provided with optical fiber is connected in a first positioning device for positioning said optical fiber cable substantially at the center of the water conduit, FIG. 16 shows the cable provided with optical fiber, still connected to the pilot cable, in which the cable provided with optical fiber has a portion inside the water conduit and the pilot cable is pulled by an operator;

FIG. 17 shows the first positioning device coupled to the inlet of the first channel of the first sealing device and the cable provided with optical fiber inserted in a second positioning device to position said optical fiber cable substantially at the center of the water conduit, FIG. 18 shows the second positioning device coupled to the further first inlet of the second sealing device and the cable provided with optical fiber inside the conduit, FIG. 19 shows the cable provided with optical fiber blocked in position by a first blocking device and by a second blocking device applied on said cable and abutting with the respective positioning device, FIGS. 20A to 33 show a second mode of inserting a cable provided with optical fiber inside a water conduit, when water under pressure flows inside said water conduit, and in particular:

FIGS. 20A, 20B, 20C show a first cable provided with an waterproof element at one of its ends respectively when it is about to be inserted inside the conduit by means of a first insertion device, when it has passed through the first channel of the first sealing device applied on the water conduit, and when it is inserted inside the conduit and dragged by the water;

FIGS. 21A, 21B, 21C, 21D show a second cable provided with a floating element at one of its ends respectively when it is about to be inserted inside the conduit by a second insertion device, when it has passed through the further first channel of the second sealing device applied to the water conduit, when the second insertion device is about to be removed, when the floating element has entered a further second channel of the second sealing device pushed by the water, FIG. 22 shows the second cable extracted from the further second channel of the second sealing device and connected to a withdrawal device for withdrawing the cable, FIG. 23 shows the withdrawal device of FIG. 22 inside the water conduit and the first cable which, dragged by the water, passes through a gripping element of the withdrawal device;

FIG. 24 shows the first cable extracted from the further second channel of the second sealing device by means of said withdrawal device, FIG. 25 shows an operator connecting the first cable with the second cable to form a pilot cable, FIG. 26 shows the pilot cable inside the water conduit with a first end external to the first channel of the first sealing device, to which the cable provided with optical fiber inserted in a first positioning device for positioning said optical fiber cable substantially at the center of the water conduit, is connected, and a second end external to the further first channel of the second sealing device, FIG. 27 shows the cable provided with optical fiber, still connected to the pilot cable, with a portion inside the water conduit, FIG. 28 shows the first positioning device coupled to the inlet of the first channel of the first sealing device, and the pilot cable pulled by an operator so that only the cable provided with optical fiber is inside the conduit, FIG. 29 shows the cable provided with optical fiber that has been pulled by the operator until it is inside the conduit, and the pilot cable that is about to be removed, FIG. 30 the cable provided with optical fiber inside the water conduit with a first end external to the inlet of the first sealing device, to which said first positioning device is coupled, and a second end which is about to be inserted into a second positioning device for positioning said optical fiber cable substantially at the center of the conduit, FIG. 31 shows the second end of the cable provided with optical fiber inserted in the second positioning device, FIG. 32 shows the cable provided with optical fiber inside the water conduit with the first end external to the inlet of the first sealing device, to which said first positioning device is coupled, and the second end external to the inlet of the a further first channel of the second sealing device, to which said second positioning device is coupled, FIG. 33 shows the cable provided with optical fiber blocked in position by a first blocking device and by a second blocking device applied on said cable and abutting with the respective positioning device.

DETAILED DESCRIPTION OF THE TECHNICAL SOLUTION

With reference to FIGS. 1-2, a method for identifying the leakage in conduit C, in which a fluid F flows.

The conduit C has a longitudinal axis A

Said method comprises the following steps:

A) providing a cable 1 comprising inside at least one first optical fiber 111, where said first optical fiber 111 is integral with a portion of an inner surface 11 of said cable 1 and said cable 1 has a longitudinal axis 1A, B) arranging said cable 1 tensioned inside said conduit C in such a way that the longitudinal axis 1A of said cable 1 is coincident or substantially coinciding or parallel or substantially parallel to the longitudinal axis A of said conduit C, in such a way that, in use, said cable 1 is inside the fluid present in said conduit C, C) for each instant time $t_K$, with k=1, ..., M where M is a positive integer and k is the index of the number of time instants, measuring the value of mechanical deformation at predetermined points $P_i$ of said cable 1, with i=1, ..., N where N is a positive integer and i is the index of the number of said predetermined points, so as to obtains a succession of values of mechanical deformation $(D_i)_k$ for each of said predetermined points $P_i$ at each time instant $t_K$:

at the time instant $t_1$
$(D_1)_1, (D_2)_1 \ldots (D_N)_1$
at the time instant $t_2$
$(D_1)_2, (D_2)_2 \ldots (D_N)_2$
...
at the time instant $t_M$
$(D_1)_M, (D_2)_M \ldots (D_N)_M$ D) for each time instant $t_K$, calculating the difference between the value of mechanical deformation $(D_i)_k$ at a predetermined point $P_i$ of said cable 1 and a respective predetermined reference value of mechanical deformation $D_{10}, D_{20} \ldots D_{N0}$ at the same predetermined point $P_i$, so as to obtain for each time instant $t_k$ a respective first succession of difference values $(\Delta D_i)_k$:

at the time instant $t_1$
$(\Delta D_1)_1, (\Delta D_2)_1 \ldots (\Delta D_N)_1$
where
$(\Delta D_1)_1=(D_1)_1-D_{10}$
$(\Delta D_2)_1=(D_2)_1-D_{20}$
...
$(\Delta D_N)_1=(D_N)_1-D_{N0}$
at the time instant $t_2$
$(\Delta D_1)_2, (\Delta D_2)_2 \ldots (\Delta D_N)_2$
where
$(\Delta D_1)_2=(D_1)_2-D_{10}$
$(\Delta D_2)_2=(D_2)_2-D_{20}$
...
$(\Delta D_N)_2=(D_N)_2-D_{N0}$
...
at the time instant $t_M$
$(\Delta D_1)_2, (\Delta D_2)_2 \ldots (\Delta D_N)_2$
where
$(\Delta D_1)_M=(D_1)_M-D_{10}$
$(\Delta D_2)_M=(D_2)_M-D_{20}$
...
$(\Delta D_N)_M=(D_{NM}-D_{N0}$ E) for each time instant $t_K$, comparing each difference value of a respective succession of difference values $(\Delta D_i)_k$ with the subsequent difference value $(\Delta D_{i+1})_k$ of said respective succession of difference values, so as to obtain a respective second succession of difference values $\{\Delta(\Delta D_i)_k\}$:

at the time instant $t_1$
$\{\Delta(\Delta D_1)_1\}, \{\Delta(\Delta D_2)_1\} \ldots \{\Delta(\Delta D_N)_1\}$
where
$\{\Delta(\Delta D_1)_1\}=(\Delta D_1)_1-(\Delta D_2)_1,$
$\{\Delta(\Delta D_2)_1\}=(\Delta D_2)_1-(\Delta D_3)_1,$
$\{\Delta(\Delta D_3)_1\}=(\Delta D_3)_1-(\Delta D_4)_1,$
...
$\{\Delta(\Delta D_N)_1\}=(\Delta D_{N-1})_1-(\Delta D_N)_1$
at the time instant $t_2$
$\{\Delta(\Delta D_1)_2\}, \{\Delta(\Delta D_2)_2\} \ldots \{\Delta(\Delta D_N)_2\}$
where
$\{\Delta(\Delta D_1)_2\}=(\Delta D_1)_2-(\Delta D_2)_2,$
$\{\Delta(\Delta D_2)_2\}=(\Delta D_2)_2-(\Delta D_3)_2,$
$\{\Delta(\Delta D_3)_2\}=(\Delta D_3)_2-(\Delta D_4)_2,$
...
$\{\Delta(\Delta D_N)_2\}=(\Delta D_{N-1})_2-(\Delta D_N)_2$
...
at the time instant $t_M$
$\{\Delta(\Delta D_1)_M\}, \{\Delta(\Delta D_2)_M\} \ldots \{\Delta(\Delta D_N)_M\}$
where
$\{\Delta(\Delta D_1)_M\}=(\Delta D_2)_M-(\Delta D_2)_M,$
$\{\Delta(\Delta D_2)_M\}=(\Delta D_2)_M-(\Delta D_3)_M,$
$\{\Delta(\Delta D_3)_M\}=(\Delta D_3)_M-(\Delta D_4)_M,$
...
$\{\Delta(\Delta D_N)_M\}=(\Delta D_{N-1})_M-(\Delta D_N)_M$ F) for each time instant $t_K$, verifying if the difference value $\{A\ (\Delta D_i)_K\}$ of each second succession of difference values is greater than 0 for determining if an amount of fluid F comes out from said conduit C between two predetermined points of said conduit C, G) for each couple of predetermined points of said cable 1 at the difference value $\{\Delta(\Delta D_i)_K\}$ of each second succession is greater than 0, in order to determine if said amount of fluid F comes out from said conduit C due to a leakage, verifying:

when the value of mechanical deformation $(\Delta D_i)_{k+1}$ at a time instant $t_{K+1}$ is equal to the value of the mechanical deformation $(\Delta D_i)_k$ at the time instant $t_K$, if the value of difference between the difference value $\{\Delta(\Delta D_i)_K\}$ between two predetermined points at the time instant $t_K$ and the difference value $\{\Delta(\Delta D_i)_{K+1}\}$ between the same predetermined points at the time instant $t_{K+1}$ is less than or equal to 0, when the value of mechanical deformation $(\Delta D_i)_{k+1}$ at a time instant $t_{K+1}$ is different from the value of mechanical deformation $(\Delta D_i)_k$ at the time instant $t_K$, if the value of the difference between the difference value $\{\Delta(\Delta D_i)_K$ between two predetermined points at the time instant K and the difference value $\{\Delta(\Delta D_i)_{K+1}\}$ between the same predetermined points at the time instant $t_{K+1}$ multiplied for the ratio between the value of mechanical deformation $(\Delta D_i)_k$ at the time $t_K$ and the value of mechanical deformation $(\Delta D_i)_{k+1}$ at the time instant $t_{K+1}$ is less than or equal to 0.

In the example being disclosed, said fluid is water and consequently the conduit is a water conduit.

However, the fluid can also be gas or oil, without departing from the scope of the invention With reference to step A, the optical fiber 111 is inserted in the cable so as to be integral with a portion of the inner surface 11 of said cable 1 in order to the optical fiber is subjected to the same deformation as the cable 1.

Consequently, a portion of optical fiber contacts a portion of the inner surface 11 of the cable 1.

With reference to step B, the cable 1 must be arranged inside the conduit C in such a way that the longitudinal axis 1A is coincident or substantially coincident or parallel or substantially parallel to the longitudinal axis A of the conduit C.

In the embodiment being disclosed, the longitudinal axis 1A of the cable 1A is coincident with the longitudinal axis A of the conduit C.

Considering a predetermined cross section of the conduit C, when the longitudinal axis 1A of the cable 1 coincides with the longitudinal axis A of the conduit C, the cable 1 is equidistant from the points of the inner surface of the conduit C itself.

The position of any leakage in the conduit does not affect the accuracy of the measurement of the mechanical deformation of the cable 1.

In the case in which the longitudinal axis 1A of the cable 1 is parallel or substantially parallel to the longitudinal axis A of the conduit C, considering a plurality of predetermined cross sections of the conduit C arranged in succession, the distance between the cable 1 and the inner surface of the conduit C will always be the same.

With reference to step C, for each time instant $t_K$ a value of mechanical deformation is measured at predetermined point $P_i$ of the cable 1 (FIG. 3).

Consequently, for each time instant $t_K$ a respective succession of values of mechanical deformation $(D_i)_k$ is obtained.

The values of each succession of values of mechanical deformation are the deformation values of the mechanical deformation of each of said predetermined point of the cable 1.

At the time instant $t_1$ the succession of values of mechanical deformation $(D_1)_1, (D_2)_1 \ldots (D_N)_1$ is obtained, at the time instant $t_2$ the succession of values of mechanical deformation $(D_1)_2, (D_2)_2 \ldots (D_N)_2$ is obtained, at the time instant $t_3$ the succession of values of mechanical deformation $(D_1)_3, (D_2)_3 \ldots (D_N)_3$ and so on.

The measurement of mechanical deformation at each of said predetermined points Pi of the cable 1 is obtained by means of an optical interrogator machine M connected to said cable 1.

It is known that through an optical fiber it is possible to carry out measurements distributed in space and it is also known that the optical fiber behaves like a series of distributed sensors and, consequently, allows to perform measurements in a large number of points or with continuity along the optic fiber.

In particular, the values of mechanical deformation at predetermined points of the cable 1, as well as the values of temperature at predetermined points of the cable 1, can be obtained through the optical fiber based on the scattering phenomena that originate from the interaction between light and matter.

Different scattering phenomena can take place in an optical fiber: Rayleigh scattering, Raman scattering and Brillouin scattering (Schenato, "*A review of distributed optic sensors for geo-hydrological application*", Applied science 2017, 7 (896); Galindez-Jamioy C. A. and Lopez-Higuera J. M "*Brillouin distributed fiber sensors: an overview and applications*", vol. 2012 n. 204121, 2012 pages 1-17; Lalam N. et al "*Analysis of Brillouin frequency shift in distributed optical fiber sensors system for strain and temperature monitoring*", proceedings of the $4^{th}$ international conference of photonics, optics and laser technology (Photonics 2016), 2016, pages 333-340).

For example, in the embodiment being disclosed, the optical fiber by which the measurements of mechanical deformation and temperature are carried out is based on the Brillouin scattering phenomenon.

The principle for measuring mechanical deformation and temperature is based on the frequency difference between incident light and backscattered light at each predetermined point of the optical fiber.

In particular, such a measurement of mechanical deformation comprises the following substeps:

C1) providing an optical interrogator machine M,

C2) connecting said optical interrogator machine M to an end of said cable 1, C3) interrogating said at least optical fiber 111 present in said cable 1 through said optical interrogator machine M.

With reference to step D, for each time instant $t_K$, the method provides the step of calculating the difference between the value of mechanical deformation $(D_i)_k$ in a predetermined point $P_i$ of the cable 1 and a respective predetermined reference value of mechanical deformation $D_{10}, D_{20} \ldots D_{N0}$ at the same predetermined point $P_i$ (FIG. 4).

In this way for each time instant $t_k$ a respective first succession of difference values $(\Delta D_i)_k$ is obtained.

At the time instant $t_1$ the succession of difference values $(\Delta D_1)_1, (\Delta D_2)_1 \ldots (\Delta D_N)_1$, in which $(\Delta D_1)_1 = (D_1)_1 - D_{10}$, $(\Delta D_2)_1 = (D_2)_1 - D_{20} \ldots (\Delta D_N)_1 = (D_N)_1 - D_{N0}$ is obtained, at the time instant $t_2$ the succession of difference values $(\Delta D_1)_2$, $(\Delta D_2)_2 \ldots (\Delta D_N)_2$ is obtained, in which $(\Delta D_1)_2 = (D_1)_2 - D_{10}$, $(\Delta D_2)_2 = (D_2)_2 - D_{20} \ldots (\Delta D_N)_2 = (D_N)_2 - D_{N0}$, and so on.

Said predetermined reference values of mechanical deformation $D_{10}, D_{20} \ldots D_{N0}$ can be obtained in different ways.

In the embodiment being disclosed, each predetermined reference value of mechanical deformation $D_{10}, D_{20} \ldots D_{N0}$ is obtained before the cable 1 is arranged inside the conduit C.

The cable 1 is tensioned with a tension equal to or substantially equal to the tension that the fluid P would exert on said cable 1 inside the conduit, connected through an end to an optical interrogator machine M and the optical fiber contained in the cable 1 is interrogated by said optical interrogator machine M.

In other words, to obtain said predetermined reference values of mechanical deformation $D_{10}, D_{20} \ldots D_{N0}$ the method can provide the following steps:
- tensioning the cable 1, outside the conduit, at a tension equal to or substantially equal to a predetermined tension equal to the tension that the fluid P would exert on said cable (1) inside the conduit,
- connecting an optical interrogator machine M to an end of said cable 1,
- interrogating said at least one optical fiber 111 present in said cable 1 through said optical interrogator machine M.

However, the predetermined reference values of mechanical deformation $D_{10}, D_{20} \ldots D_{N0}$ can also be obtained in other ways.

For example, said predetermined reference values of mechanical deformation $D_{10}, D_{20} \ldots D_{N0}$ can be obtained through a manual or numerical simulation, knowing some parameters, as explained below.

Said parameters can be for example the speed of the fluid (which can be an average speed or the maximum speed), the density of the fluid, the radius of the cable, the radius of the conduit, the friction coefficient of the cable, the elasticity of the cable.

The mechanical deformations of the cable can be due to the pulling force $F_t$ and/or suction force $F_r$.

Below, it will be explained how to obtain the mechanical deformation of the cable from the pulling force $F_t$ and the suction force $F_r$.

It should be noted that the reference values of mechanical deformation $D_{10}, D_{20} \ldots D_{N0}$ depend only on the pulling force $F_t$ as it is not possible to know a priori if said conduit has one or more leakages.

Consequently, said predetermined reference values of mechanical deformation $D_{10}, D_{20} \ldots D_{N0}$ are obtained only by knowledge of the pulling force.

The pulling force $F_t$ is the force generated by the friction on the cable-water separation surface and is calculated according to the following formula:

$$F_t = \mu F_{perp}$$

where
$\mu$ is the coefficient of dynamic friction between water and cable
$F_{perp}$ is the perpendicular force, i.e. the force that the water flow exerts on a surface equal to the water-cable interaction surface.

The perpendicular force $F_{perp}$ is calculated according to the following formula:

$$F_{perp} = p_{din} * S$$

where
$p_{din}$ the dynamic pressure of the water flow
S is the side surface of the cable.

The dynamic pressure $p_{din}$ is calculated according to the following formula:

$$p_{din} = \frac{1}{2}\rho v^2$$

where
$\rho$ is the water density (1000 Kg/m$^3$),
v is the speed water,
The side surface S of the cable is calculated according to the following formula:

$$S = 2\pi r_1 L$$

where
$r_1$ is the radius of the cable,
L is the initial length of the cable (i.e. the length of the cable in its undeformed state), By replacing the expressions of the dynamic pressure $p_{din}$ and of the side surface S in the relationship of the perpendicular force $F_{perp}$, and the expression of the perpendicular force $F_{perp}$ in the expression of the pulling force is obtained:

$$F_t = \mu \rho v^2 \pi r_1 L$$

The water speed v can be approximated with the maximum speed $v_{max}$ or with the average speed $v_m$ according to the formulas:

$$v_{max} = -\frac{1}{4\eta}\left(\frac{p_2 - p_1}{L}\right)r_0^2$$

where
$\eta$ is the viscosity of water $$\left(\frac{p_2 - p_1}{L}\right)$$

is the variation in static pressure with respect to the longitudinal axis of the conduit
$r_0$ is the radius of the conduit $$v_m = \frac{Q}{sez} = \frac{Q}{\pi r_0^2}$$

where
Q is the water flow rate in m$^3$/sec
sez is the area of the conduit section.
From Hooke's law it is known that:

$$F_t = k \Delta L$$

where
k is the elasticity coefficient of the cable,
$\Delta L$ is the difference between the final length (i.e. the length of the cable in its deformed state) and the initial length of the cable (i.e. the length of the cable in its undeformed state).

The mechanical deformation $\Delta D_t$ due to the pulling force $F_t$ is given by the following formula:

$$\Delta D_t = \frac{\Delta L}{L} = \frac{F_t}{kL}$$

The suction force $F_r$ is the force exerted on the cable in the presence of leakages (utilities, holes, worn joints, etc.).

The presence of a hole in the conduit generates a difference in static pressure that generates a force in the direction of the hole.

Such a force is proportional to the size of the hole and to the pressure difference between the pressure inside the conduit and the pressure outside the conduit.

$$F_r = \Delta p S_f = (p_{int} - p_{ext}) \pi r_f^2 (0 < r_f < 2 r_0)$$

where
$\Delta p$ is the difference between the pressure inside the conduit and the pressure outside the conduit
$p_{int}$ is the pressure inside the conduit $p_{ext}$ è the pressure outside the conduit
$S_f$ is the area of the hole
$r_f$ is the radius of the hole, whose value can be between 0 and the diameter of the conduit.

In reality, within the conduit, before the leakage and after the leakage, there are swirling motions and therefore turbulence.

The swirling motions extend over a length of the conduit that varies according to the speed of the fluid and the size of the hole.

As the speed of the fluid and the size of the hole increase, the length of the conduit affected by such swirling motions.

Inside the conduit, before the leakage the average water speed is greater than the average water speed after leakage.

The vector field of the water speed varies according to the distance from the hole.

Near the hole, the vector field of water speeds is most affected by the suction force.

In fact, the suction force $F_r$ is greater near the hole and for this reason a coefficient φ which takes into account this distance is introduced.

$$\varphi = \frac{F_r}{F_{r_{MAX}}} \quad 0 < \varphi < 1$$

In the case of φ=0 the distance between the cable and the hole tends to infinite.

In the case of φ=1 the distance between the cable and the hole is zero so the suction force is maximum.

$F_r = \varphi \Delta p S_f = \varphi(p_{int} - p_{ext})\pi r_f^2$

If the cable is positioned so as to have its longitudinal axis coinciding with the longitudinal axis of the conduit, and therefore the distance of the cable from the conduit wall is equal to half the maximum distance, it is possible to assume the coefficient φ equal to 0.5.

Consequently, the suction force $F_r$ is:

$F_r = 0.5 \varphi \Delta p S_f = 0.5 \varphi (p_{int} - p_{ext})\pi r_f^2$

This relation is an approximation of the real suction force that can be derived iteratively from experimental procedures.

From the Hooke's law it is known that:

$F_r = k \Delta L$ where
k is the elasticity coefficient of the cable,
ΔL is the difference between the final length (i.e. the length of the cable in its deformed state) and the initial length of the cable (i.e. the length of the cable in its undeformed state).

The mechanical deformation $\Delta D_r$ due to the pulling force $F_t$ is given by the following formula:

$$\Delta D_r = \frac{\Delta L}{L} = \frac{F_r}{kL}$$

The mechanical deformations can be generated either by the pulling force $F_t$ or by the suction force
In this case the total force is given by:

$\vec{F}_{tot} = \vec{F}_t + \vec{F}_r$

In absolute value the total force is given by:

$F_{tot} = \sqrt{F_t^2 + F_r^2}$

From the Hooke's law it is known that:

$F_{tot} = k \Delta L$

The mechanical deformation $\Delta D_{tot}$ due to the total force $F_{tot}$:

$$\Delta D_{tot} = \frac{\Delta L}{L} = \frac{F_{tot}}{kL}$$

In case the maximum speed is used in the pulling force $$v_{max} = -\frac{1}{4\eta}\left(\frac{p_2' - p_1'}{L}\right) r_0^2$$

where
$p_2' - p_1'$ are the static pressure values before the leakage $$v_m = \frac{Q'}{sez} = \frac{Q'}{\pi r_0^2}$$

where
Q' is the water flow rate in m³/s before the leakage.

The pulling force is present both before and after the water leakage, but has different values because it depends on the flow rate.

The following are the cases that may arise.
First case: $F_t \gg F_r$

In this first case the factor Q', i.e. the flow rate present in the pulling force prevails over the factor $(p_{int} - p_{ext}) r_{foro}^2$, present in the suction force.

The deformation of the cable before the leakage is greater than the deformation after the leakage because the pulling force before the leakage is greater than the pulling force after the leakage.

Second Case: $F_t \sim F_r$

The deformation of the cable after leakage is zero.

In other words, the tension of the cable, after the hole causing the leakage, is substantially the same as the tension with which it is arranged inside the conduit.

In this second case, the factor $(p_{int} - p_{ext}) r_f^2$, present in the suction force, is equivalent to the factor Q', i.e. the flow rate present in the pulling force.

This means that the hole has sufficiently large size that the effect of the hole prevails over the effect of the flow rate.

In other words, all the water comes out from the hole.

Third case $F_t = 0$ (water does not move).

In other words, the tension of the cable is substantially the same as the tension with which it is arranged inside the conduit.

In this case, the presence of a leakage generates one of the following conditions $F_t \sim F_r \circ F_t < F_r$.

The deformation of the cable increases before and after the hole that causes the leakage, since the suction force $F_r$ is the only force present.

The more water comes out of the hole, the greater the deformation of the cable.

With reference to step E, the method provides the step of comparing for each time instant $t_K$ each difference value of a respective succession of difference values $(\Delta D_i)_k$ with the next difference value $(\Delta D_{i+1})_k$ of said respective succession of difference values, so as to obtain a respective second succession of difference values $\{\Delta(\Delta D_i)_k\}$ (FIG. 5).

At the time instant $t_1$ the succession of difference values $\{\Delta(\Delta D_1)_1\}, \{\Delta(\Delta D_2)_1\} \ldots \{\Delta(\Delta D_N)_1\}$ is obtained, in which $\{\Delta(\Delta D_1)_1\}=(\Delta D_1)_1-(\Delta D_2)_1$, $\{\Delta(\Delta D_2)_1\}=(\Delta D_2)_1-(\Delta D_3)_1$, $\{\Delta(\Delta D_3)_1\}$, $(\Delta D_3)_1-(\Delta D_4)_1 \ldots \{\Delta(\Delta D_N)_1\}=(\Delta D_{N-1})_1-(\Delta D_N)_1$, at the time instant $t_2$ the succession of difference values $\{\Delta(\Delta D_1)_2\}, \{\Delta(\Delta D_2)_2\} \ldots \{\Delta(\Delta D_N)_2\}$ is obtained, in which $\{\Delta(\Delta D_1)_2\}=(\Delta D_1)_2$ $(\Delta D_2)_2$, $\{\Delta(\Delta D_2)_2\}=(\Delta D_2)_2-(\Delta D_3)_2$, $\{\Delta(\Delta D_3)_2\}$ $(\Delta D_3)_2-(\Delta D_4)_2 \ldots \{\Delta(\Delta D_N)_2\}=(\Delta D_{N-1})_2-(\Delta D_N)_2$ and so on.

In other words, for each time instant, each difference value (which is the difference between the value of mechanical deformation $(D_i)_k$ in a predetermined point $P_i$ of said cable and a respective predetermined reference value of mechanical deformation $D_{10}, D_{20} \ldots D_{N0}$) is compared with the successive difference value.

In the embodiment being disclosed, said reference values of mechanical deformation are stored in a memory of the optical interrogator machine M.

With reference to the conduit, it is possible distinguish two cases: when the conduit is devoid of leakages and when the conduit has a leakage.

When there is no leakage, only the pulling force is present.

The difference values of each second succession of difference values are equal to 0 as the mechanical deformation in each predetermined point of the cable depends only on the pulling force which has the same value in each of said predetermined points.

When the conduit has a leakage, the suction force is added to the pulling force.

The total force is given by the vectorial sum of the pulling force and the suction force.

One or more difference values of each second succession of difference values are different from 0 as the mechanical deformation in a predetermined point of the cable depends only by the pulling force (as the suction force is equal to 0) and the mechanical deformation in a further predetermined point of the cable, arranged in succession to said predetermined point, depends on the pulling force and the suction force, the latter having a value different from 0.

With reference to step F, for each time instant $t_K$, the method provides the step of verifying if the difference value $\{\Delta(\Delta D_i)_K\}$ of each second succession of difference values is greater than 0 for determining if an amount of the fluid F comes out from said conduit C between two predetermined points of said conduit C.

The fact that the difference value of each second succession of difference values is greater than 0 implies that an amount of fluid F is coming out from the conduit.

However, the outflow of said amount of fluid from the conduit can be due to a leakage (for example due to a hole in the conduit) or to user (for example when a person opens the water tap).

With reference to step G, for each couple of predetermined points of said conduit C at the difference value $\{\Delta(\Delta D_i)_K\}$ of each second succession is greater than 0, the method provides one of two checks, below disclosed, based on the value of the speed of the fluid F over time (and therefore from the speed variation) which is defined by the difference between the mechanical deformation values associated with the same predetermined point $P_i$ of the cable 1 in successive time instants.

In particular, with reference to each predetermined point $P_i$ of the cable 1, the speed variation of the fluid over time can be equal to or different from zero.

When the mechanical deformation at the time instant $t_{K+1}$ is equal to the value of mechanical deformation at the time instant $t_K$ means that the speed variation of the fluid in two successive time instants is equal to zero.

When the mechanical deformation at the time instant $t_{K+1}$ is different from the value of mechanical deformation at the time instant $t_K$ means that the speed variation of the fluid in two successive time instants is different from zero.

When the value of mechanical deformation $(\Delta D_i)_{k+1}$ at the time instant $t_{K+1}$ is equal to the value of mechanical deformation $(\Delta D_i)_k$ at the time instant $t_K$ (and as result the speed variation of the fluid is equal to zero) the method provides the step of verifying if the value of the difference between the difference value $\{\Delta(\Delta D_i)_K\}$ between two predetermined points at the time instant $t_K$ and the difference value $\{\Delta(\Delta D_1)_{K+1}\}$ between the same predetermined points at the time instant $t_{K+1}$ is less than or equal to 0, for determining if the amount of fluid F comes out from the conduit C due to a leakage.

When the value of mechanical deformation $(\Delta D_i)_{k+1}$ at the time instant $t_{K+1}$ is different from the value of mechanical deformation $(\Delta D_i)_k$ at the time instant $t_K$ (and as result the speed variation of the fluid is different from zero) the method provides the step of verifying if the value of the difference between the difference value $\{\Delta(\Delta D_i)_K\}$ between two predetermined points at the time instant K and the difference value $\{\Delta(\Delta D_i)_{K+1}\}$ between the same predetermined points at the time instant $t_{K+1}$, where said difference value $\{\Delta(\Delta D_i)_{K+1}\}$ is multiplied for the ratio between the value of the mechanical deformation $(\Delta D_i)_k$ at the time instant $t_K$ and the value of the mechanical deformation $(\Delta D_i)_{k+1}$ at the time instant $t_{K+1}$ is less than or equal to 0.

As said above, from the difference values of a second succession of difference values at a same time $t_K$, it follows that an amount of fluid is coming out from the conduit.

To verify if the conduit has a leakage, the values of the difference between each second succession of difference values at the same predetermined points of the cable in successive time instants are considered.

If the value of the difference between the difference value $\{\Delta(\Delta D_i)_K\}$ between two predetermined points at the instant time k and the difference value $\{\Delta(\Delta D_i)_{K+1}\}$ between the same predetermined points at the time instant $t_{K+1}$ is less than or equal to 0, the amount of fluid comes out from the conduit due to a leakage of the conduit itself.

The method can comprise the step H), i.e. the step of calculating the position of the leakage with respect to the length of the conduit C, by calculating the distance between a couple of predetermined points of said cable 1 at the difference value $\{\Delta(\Delta D_i)_K\}$ is greater than 0 and a further couple of predetermined points of said cable 1 at the difference value $\{\Delta(\Delta D_i)_K\}$ is lower than or equal to 0, where said further couple of predetermined points is arranged in succession to said couple of predetermined points.

Said method can comprises the following steps:
for each time instant $t_K$, verifying if the difference value $\{\Delta(\Delta D_i)_K\}$ of each second succession of difference values is equal to 0,
if the difference value $\{\Delta(\Delta D_i)_K$ is equal to 0, verifying if at different time instant $t_k$, the value of the difference between the difference value $(\Delta D_i)_K$ at a predetermined point $P_i$ of the cable 1 at the time instant $t_K$ and the difference value $(\Delta D_i)_{K+1}$ in correspondence to the same predetermined point $P_i$ at time instant $t_{K+1}$ is different from 0, for determining the change of the speed of the fluid between two subsequent time instants referred to a predetermined point $P_i$ of said conduit C.

With reference to the cable 1, said cable 1 can comprise in its inside a second optical fiber.

By adding a second optical fiber inside the cable 1 it is possible to obtain, on the one hand, a better spatial resolution with reference to the position of the predetermined points $P_i$ of the cable (from which the information on the mechanical deformation of the cable itself derives), when said second optical fiber is connected to said first optical fiber 111 and, on the other hand, it is possible to measure the temperature at each predetermined point $P_i$ of the cable 1, when said second optical fiber is arranged inside a hollow element, so as not to be subjected to mechanical deformation, i.e. not subjected to a tensile force and/or compression force.

Figure 6:
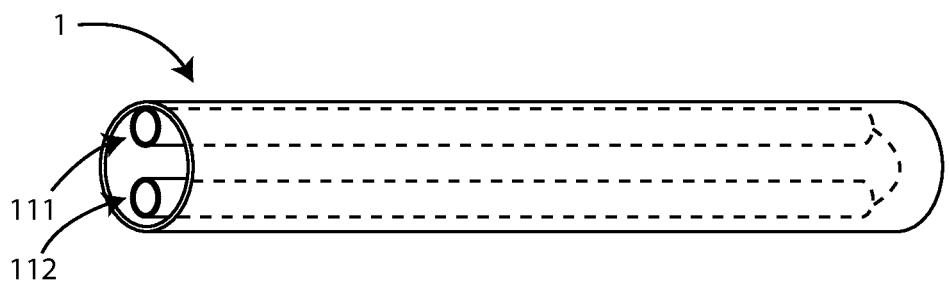
FIG. 6 shows a first variant of the cable comprising inside a first optical fiber and a second optical fiber connected together.

In a first variant, shown in FIG. 6, said cable 1 comprises inside a second optical fiber 112 with an end connected to an end of said first optical fiber 111.

Hence, through said variant, it is possible obtain a better spatial resolution.

Figure 7:
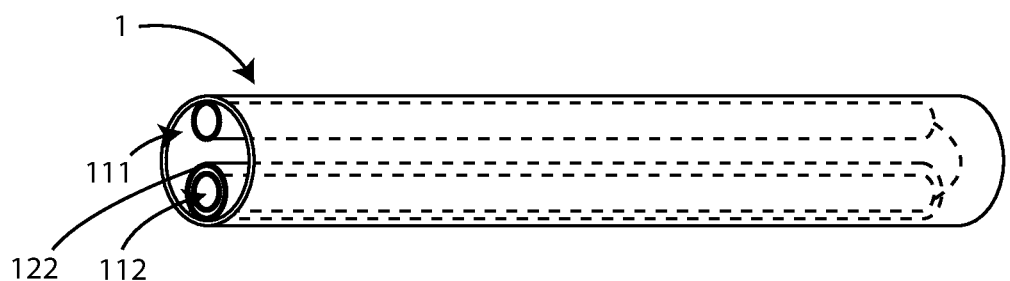
FIG. 7 shows a second variant of the cable comprising inside a first optical fiber and a second optical fiber connected together, in which the second optical fiber is inside a hollow element.

In a second variant, shown in FIG. 7, differently from the first variant, said second optical fiber 112 is arranged inside a hollow element 122 (for example a cylindrical element in pvc material), arranged in turn inside the cable 1.

Hence, by means of the second variant it is possible to obtain on one hand a better spatial resolution (due to the connection between said second optical fiber and the first optical fiber) and on the other hand a measurement of the temperature for each predetermined point $P_i$ of the cable 1 (due to the fact that the second optical fiber is arranged inside said hollow element).

Figure 8:
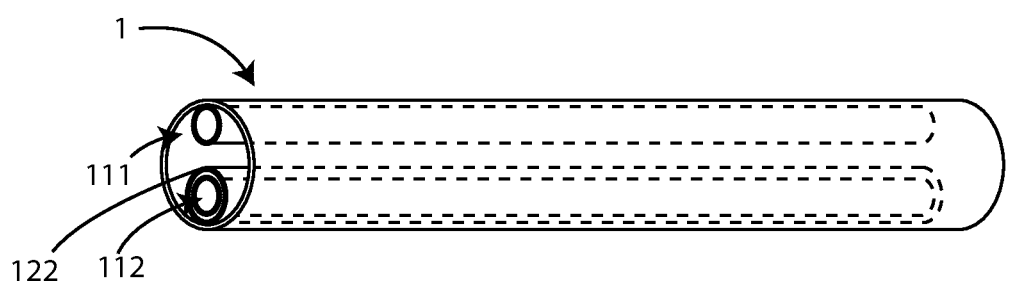
FIG. 8 shows a first variant of the cable comprising inside a first optical fiber and a second optical fiber, the latter inside a hollow element.
Figure 9:
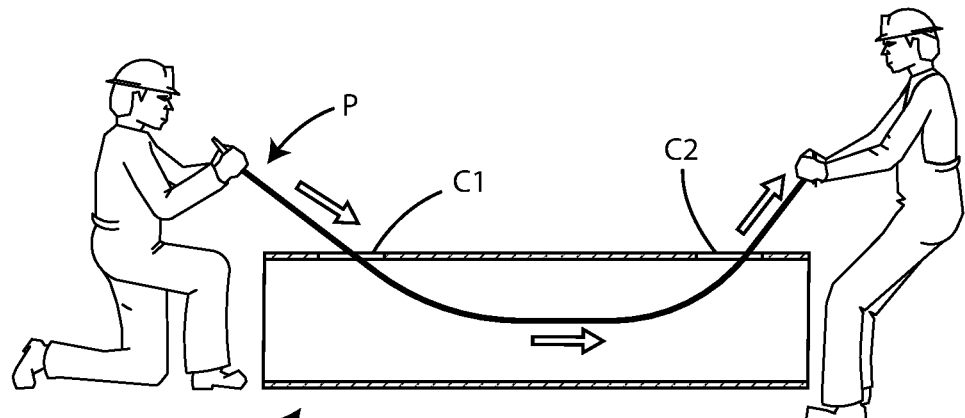
FIGS. 9 to 19 show a first mode of inserting a cable provided with optical fiber inside a water conduit, when the conduit is devoid of water, and in particular.
Figure 10:
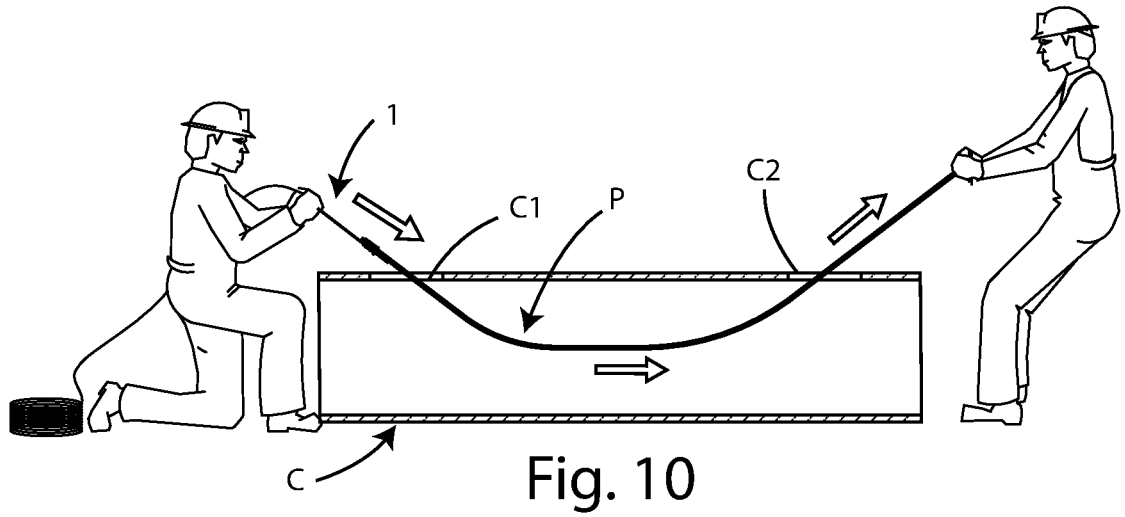

In a third variant, shown in FIG. 8, said second optical fiber 112 is arranged inside said hollow element 122, but it has not an end connected with the end of the first optical fiber.

Consequently, by means of said third variant, it is possible to measure the temperature at each predetermined point $P_i$ of the cable 1.

In the embodiment being disclosed, the cable is first inserted in the conduit and after tensioned.

The longitudinal axis is coincident with the longitudinal axis of the conduit.

If the conduit C is closed (water-free), the step B can comprise the following sub-steps shown schematically in FIGS. 9 to 19:

inserting a pilot probe or pilot cable P in the conduit C through a first opening C1 of said conduit, withdrawing said pilot probe P through a second opening C2 of said conduit, spaced from said first opening C1, in such a way that said pilot probe P has a part inside the conduit C, as well as a first end external to said first opening C1, and a second end external to said second opening C2 (FIG. 9), connecting said cable 1 to said pilot probe P (FIG. 10), pulling said pilot probe P until said cable 1 is inside the conduit with a first end external to said first opening and a second end external to said second opening (FIG. 11), providing a first sealing device 21 having a longitudinal axis $AL_1$ and shaped to be adapted to the conduit (preferably with a cylindrical or substantially cylindrical shape), where said first sealing device comprises a first channel 21A for the passage of at least one cable, where said first channel 21A has an inlet and an outlet and is arranged along a first axis A1 inclined with respect to a transverse plane of said first sealing device 21A in such a way that said first channel 21A forms with said longitudinal axis $AL_1$ a first angle $\alpha$ (FIG. 12), positioning said first sealing device around a first portion of said conduit C, at the first opening of said conduit, in such a way that its longitudinal axis $AL_1$ coincides with or substantially coincides with the longitudinal axis A of the conduit C, and the cable 1 passes through said first channel 21A and has a first portion external to the inlet of said first channel 21A (FIG. 13), clamping the first sealing device 21 on the conduit C, providing a second sealing device 22 having a longitudinal axis $AL_2$ and shaped to be adapted to the conduit (preferably with a cylindrical or substantially cylindrical shape), where said second sealing device comprises a further first channel 22A for the passage of at least one cable, where said further first channel 22A has an inlet and an outlet and is arranged along a further first axis A1' inclined with respect to a second transverse plane of said second sealing device 22, different from said first transverse plane, in such a way that said further first channel 22A forms with said second longitudinal axis $AL_2$ a further first angle $\beta$ (FIG. 13), positioning said second sealing device 22 around a second portion of said conduit C, at the second opening of said conduit C, in such a way that its longitudinal axis $AL_2$ coincides or substantially coincides with the longitudinal axis A of the conduit C, and the cable passes through said further first channel 22A and has a second portion external to the inlet of said second further first channel (FIG. 14), clamping the second sealing device 22 on the conduit C, providing a first positioning device 61 for positioning said cable 1 inside the conduit at an axis coinciding with or substantially coinciding with or parallel to or substantially parallel to the longitudinal axis A of said conduit C (FIG. 15), where said first device positioning 61 comprises:

a body 611 having a part configured to be coupled with the inlet of said first channel 21A of the first sealing device 21, a sealing element 612 arranged on said body 611, a hollow element 613, arranged at least partially inside said body 611 and sliding with respect to said body 613, inserting a first end of the cable 1 in the sealing element 612 of the first positioning device 61 (FIG. 15), connecting said cable 1 to said pilot probe P (FIG. 15), coupling said first positioning device 61 to the first channel 21A of the first sealing device 21 (FIG. 16), inserting said hollow element 613 in the first channel 21A of the first sealing device 21 (FIG. 16), pushing the hollow element 613 of the first positioning device 61 inside the first channel 21A of the first sealing device 21 in order to a portion of the body 612 of the first positioning device 61 contacts the inlet of said first channel 21A and said hollow element 613 has a portion inside the conduit C (FIG. 16), pulling said pilot probe P until said cable 1 is inside the conduit C and has a first end external to the inlet of the first channel 21A of the first sealing device 21 and a second end external to the inlet of the further first channel 22A, providing a second positioning device 62 for positioning said cable 1 inside the conduit at an axis coincident with or substantially coinciding with or parallel to or substantially parallel to the longitudinal axis A of said conduit C (FIG. 17), where said second device positioning 62 comprises:

a body 621 having a part configured to be coupled to the inlet of said further first channel 22A of the second sealing device 22, a sealing element 622 arranged on said body 621, a hollow element 623, arranged at least partially inside said body 621 and sliding with respect to said body 623, withdrawing the cable 1 from the further first channel 22A of the second sealing device, inserting the first end of the cable 1 in the sealing element 622 of the second positioning device 62, coupling said second positioning device 62 to the further first channel 22A of the second sealing device 22 (FIG. 18), inserting said hollow element 623 in the further first channel 22A (FIG. 18), pushing the hollow element 623 of the second positioning device 62 into the further first channel 22A in order to a portion of the body 622 of said second positioning device 62 contacts the inlet of said further first channel 21A (FIG. 18), pulling the cable 1 so that it is tensioned, providing a first blocking device 31 to prevent the cable 1 from sliding with respect to the sealing element 612 of the first positioning device 61 and/or a second blocking device 32 to prevent the cable 1 from sliding with respect to the sealing element 622 of the second positioning device 62, positioning said first blocking device 31 abutting to said first positioning device 61 and/or said second blocking device 32 abutting to said second positioning device 62 (FIG. 19).

If the conduit C is open (pressurized water or free-surface water or water pumped by pumping devices), this step B can comprise the following substeps shown schematically in FIGS. 20A to 33:

providing a first sealing device 21 having a longitudinal axis $AL_1$ and shaped to be adapted to the conduit C (preferably with a cylindrical or substantially cylindrical shape), where said first sealing device comprises:

a first channel 21A for the passage of at least one cable, where said first channel 21A has an inlet and an outlet and is arranged along a first axis A1 inclined with respect to a first transverse plane of said first sealing device 21 in such a way that said first channel 21A forms with said longitudinal axis $AL_1$ a first angle α, first opening/closing means 221A for opening/closing said first channel 21A so as to allow/prevent the passage of water, a second channel 21B for the passage of at least one cable, where said second channel 21B has an inlet and an outlet and is arranged along a second axis A2 perpendicular to or substantially perpendicular to the longitudinal axis $AL_1$ of the first sealing device 21 and forms with said first axis A1 of said first channel 21A a third angle θ, second opening/closing means 221B for opening/closing said second channel 21B so as to allow/prevent the passage of water, positioning said first sealing device 21 around a first portion of said conduit C, in such a way that its longitudinal axis $AL_1$ coincides with or substantially coincides with the longitudinal axis A of the conduit C, clamping said first sealing device 21 on the conduit C, drilling through said second channel 21B the conduit C to create a first opening C1 (during the step of creating the first opening C1, said first opening/closing means 221A are closed and said second opening/closing means 221B are open, once the creation of the first opening C1 has been completed said second opening/closing means 221B are closed), providing a second sealing device 22 having a longitudinal axis $AL_2$ and shaped to be adapted to the conduit (preferably with a cylindrical or substantially cylindrical shape), where said second sealing device 22 comprises:

a further first channel 22A for the passage of at least one cable, where said further first channel 22A has an inlet and an outlet and is arranged along a further first axis A1' inclined with respect to a second transverse plane of said second sealing device 22, different from said first transverse plane, in such a way that said further first channel 22A forms with said second longitudinal axis $AL_2$ a further first angle β, further first opening/closing means 222A for opening/closing said further first channel 22A so as to allow/prevent the passage of water, a further second channel 22B for the passage of at least one cable, where said further second channel 22B has an inlet and an outlet and is arranged along a further second axis A2' perpendicular or substantially perpendicular to the longitudinal axis $AL_2$ of the second sealing device 22 and forms with said second axis A2 of said second channel 22A a third angle δ, further second opening/closing means 222B for opening/closing said second channel 22B so as to allow/prevent the passage of water, positioning said second sealing device 22 around a second portion of said conduit C, in such a way that its longitudinal axis $AL_2$ coincides with or substantially coincides with the longitudinal axis A of the conduit C, clamping said second sealing device 22 on the conduit C, drilling through said further second channel 22B the conduit C to create a second opening C2 (during the step of creating said second opening C2 said further first opening/closing means 222A are closed and said further second opening/closing means 222B are open, once the step of creating the second opening C2 has been completed, said further second opening/closing means 222B are closed), providing a first cable P1 having a first end and a second end and comprising an element P12 made of waterproof material at said second end shaped to be dragged by water, in particular in the form of a parachute (FIG. 20A), providing a first insertion device 41 for inserting said first cable P1 inside the conduit C (FIG. 20A), where said first insertion device 41 comprises:

a body 411 configured to be coupled to the inlet of the first channel 21A of the first sealing device 21, a sealing element 412 arranged on said body 411, a pushing element 413 for pushing said first cable P1 inside the conduit C1, arranged at least partially inside said body 411 and sliding with respect to said body 411, inserting said first cable P1 in the sealing element 412 of said first insertion device 41 (FIG. 20B), coupling said first insertion device 41 to the first channel 21A of the first sealing device 21 (FIG. 20C), pushing said first cable P1 through said pushing element 413 of the first insertion device 41 in such a way that the first end of said first cable P1 is outside the sealing element 412 of the first insertion device 41 and the second end is inside the conduit C (during this step said first opening means 221A are open);

providing a second cable P2 having a first end and a second end and comprising a floating element P21 at said second end (FIG. 21A),
providing a second insertion device 42 for inserting said second cable P2 inside the conduit C (FIG. 21A), where said second insertion device 42 comprises:
a body 421 configured to be coupled to the inlet of said further first channel 22A of the second sealing device 22,
a sealing element 422 arranged on said body,
a pushing element 423 for pushing said second cable P2 inside the conduit C, arranged at least partially inside said body 421 and sliding with respect to said body 421,
inserting said second cable P2 into the sealing element 422 of said second insertion device 42 (FIG. 21B),
coupling said second insertion device 42 to the further first channel 22A of the second sealing device 22 (FIG. 21C),
pushing said second cable P2 through the pushing element 423 of the second insertion device 41 in such a way that the first end of said second cable P2 is outside the sealing element 422 of the second insertion device 42 and the second end is inside the conduit C (during this step said further first opening/closing means 222A are open),
verifying whether said floating element P21 of said second cable P2 is in proximity of the inlet of said further second channel 22B (this step is performed when said further first opening means 222A are open; for this step said further second channel can have a portion of transparent material or the second sealing device can comprise a closure element, couplable to the further second channel, to close said further second channel having at least one portion of transparent material);
if said floating element P21 is in proximity of the inlet of said further second channel 22B, withdrawing the second end of said second cable P2 through the further second channel 22B of the second sealing device 22, so that the second end of said second cable is external to the inlet of said further second channel 22B (this step is performed when said further second opening/closing means 222B are closed),
providing a withdrawal device 50 for withdrawing said first cable P1, configured to be coupled to said further second channel 22B of said second sealing device 22 and comprising a gripping element 50A sliding partially inside said withdrawal device and having a substantially circular shape capable of assuming a first configuration, in which it has a first diameter, to a second configuration, in which it has a second diameter, greater than said first diameter (FIG. 22),
coupling said withdrawal device 50 with the inlet of said further second channel 22B of said second sealing device 22 (FIG. 23),
inserting said withdrawal device into the further second channel of the second sealing device (FIG. 23; this step is performed when said further second opening/closing means 222B are open),
withdrawing the second end of said first cable P1 through the further second channel 22B of the second sealing device 22 (FIG. 24),
connecting the first cable P1 with the second cable P2 in such a way as to form a pilot cable (FIG. 25; this step is performed when said further second opening/closing means 222B are closed), closing the inlet of said further second channel 22B (for this step the second sealing device can comprise a closing element, couplable to the further second channel, to close said further second channel),
pulling the first end or the second end of said pilot cable in such a way that said pilot cable has a first end external to the input of the first channel 21A of the first sealing device 21 and an end external to the inlet of the further first channel 22A of the second sealing device 22 (this takes place when said further second opening/closing means 222B are open),
removing said first insertion device 41 (this step is performed when said first opening/closing means 221A are closed)
providing the first positioning device 61 (described above) for positioning said cable 1 inside the conduit at an axis coincident with or substantially coincident with or parallel to or substantially parallel to the longitudinal axis A of said conduit C (FIG. 26),
inserting a first end of the cable 1 in the sealing element 612 of the first positioning device 61 (FIG. 26),
connecting said cable 1 to said pilot cable (FIG. 26),
coupling said first positioning device 61 to the first channel 21A of the first sealing device 21 (FIG. 27),
inserting said hollow element 613 into the first channel 21A of the first sealing device 21 (FIG. 27; this step is performed when said first opening/closing means 221A are open),
pushing the hollow element 613 of the first positioning device 61 inside the first channel 21A of the first sealing device 21 in order to a portion of the body 612 of the first positioning device 61 contacts the inlet of said first channel 21A and said hollow element 613 has a portion inside the conduit C (FIG. 27),
pulling said pilot cable until said cable 1 is inside the conduit C and has a first end external to the inlet of the first channel 21A of the first sealing device 21 and a second end external to the inlet of the second channel 22A of the second sealing device 22,
removing said second insertion device 42 (FIG. 28; this step is performed when said second opening/closing means 222A are closed),
providing the second positioning device 62 (described above) for positioning said cable 1 inside the conduit at an axis coincident with or substantially coincident with or parallel to or substantially parallel to the longitudinal axis A of said conduit C (FIG. 30),
withdrawing the cable 1 from the further first channel 22A of the second sealing device (FIG. 31),
inserting the first end of the cable 1 in the sealing element 622 of the second positioning device 62 (FIG. 31),
coupling said second positioning device 62 to the further first channel 22A of the second sealing device 22 (FIG. 32),
inserting said hollow element 623 in the further first channel 22A (FIG. 32; this step is performed when said further first opening/closing means 222A are open),
pushing the hollow element 623 of the second positioning device 62 into the further first channel 22A in order to a portion of the body 622 of said second positioning device 62 contacts the inlet of said further first channel 21A,
pulling the cable 1 so that it is tensioned (FIG. 32),
providing a first blocking device 31 to prevent the cable 1 from sliding with respect to the sealing element 612 of the first positioning device 61 and/or a second blocking device 32 to prevent the cable 1 from sliding with respect to the sealing element 622 of the second positioning device 62, positioning said first blocking device 31 abutting to said first positioning device 61 and/or said second blocking device 32 abutting to said second positioning device 62 (FIG. 33).

Regardless of whether the conduit is closed or open, the hollow element 613 of the first positioning device 61 has a length such that, in use, said hollow element 613 extends substantially from the inlet of the first channel 21A of the first device seal 21 inside the conduit C to an axis coincident or substantially coincident with or parallel to or substantially parallel to the longitudinal axis A of said conduit C, and the hollow element 623 of the second positioning device 62 has a length such that, in use, said hollow element 623 extends substantially from the inlet of the further first channel 22A of the second sealing device 22 to the inside of the conduit C to an axis parallel or substantially parallel to the longitudinal axis A of said conduit C.

Said axis (i.e. the axis coincident or substantially coincident or parallel or substantially parallel to the longitudinal axis A of said conduit C) is within the volume of water present in said conduit C, preferably in an intermediate position between the level of the water and the bottom of the conduit C.

In other words, the length of each hollow element 613,623 is such as to intercept an axis arranged within the volume of water to allow also the cable inside the conduit C to be within said volume of water.

In the embodiment being described, each of said hollow elements 613, 623 is a hollow bar.

Regardless of the mode with which the cable 1 is arranged tensioned inside the conduit C, each angle $\alpha$, $\beta$, can have a value between 5° and 45°, and each angle $\theta$, $\delta$ can have a value between 45° and 85°.

In the embodiment being disclose, each angle $\alpha$, $\beta$ is equal to 30° and each angle $\theta$, $\delta$ is equal to 60°.

Furthermore, each sealing device 21,22 comprises a respective first part 211,221 and a respective second part 212,222, couplable to said first part 211,221.

In the example being described, the conduit C has an annular cross-section and said first part 211,221 and said second part 212,222 of each sealing device 21,22 have a semi-circular cross-section to contact the outer surface of the conduit C.

In particular, the first sealing device 21 is provided with first clamping means 210 for clamping the first sealing device 21 on the conduit C and the second sealing device 22 is provided with second clamping means 220 for clamping the second sealing device 22 on the conduit C.

The present invention relates also to a system for identifying a leakage in a conduit in which a fluid flows.

Said system comprises:

a cable 1 comprising inside at least one first optical fiber 111, where said cable 1 has a longitudinal axis 1A and said first optical fiber 111 is integral with a portion of an inner surface 11 of said cable 1;

an optical interrogator machine M for interrogating said at least one first optical fiber 111, where said optical interrogator machine M is provided with at least one input for receiving an end of said cable 1, a control logic unit U configured to perform the steps from C to G of the method above mentioned, a first sealing device 21 having a longitudinal axis $AL_1$ and shaped to be adapted to the conduit C in such a way that, in use, said first sealing device 21 is positioned around a first portion of said conduit C and its longitudinal axis $AL_1$ is coincident or substantially coincident with the longitudinal axis A of the conduit C, a second sealing device 22 having a longitudinal axis $AL_2$ and shaped to be adapted to the conduit C, in such a way that, in use, said second sealing device 22 is positioned around a second portion of said conduit C, spaced from said first portion, and its longitudinal axis $AL_2$ is coincident or substantially coincident with the longitudinal axis A of the conduit C, a first positioning device 61 and a second positioning device 62 for positioning said cable 1 inside the conduit C.

With reference to the optical interrogator machine, in order to interrogate said at least one optical fiber, said optical interrogator machine is configured to generate light signals to be sent in each optical fiber and to receive response signals by each optical fiber, as well as to determine the values of mechanical deformation of the cable (when only a first optical fiber is present in the cable) or the values of mechanical deformation and of temperature of the cable (when a second optical fiber is present in the cable, arranged inside a hollow element)

With reference to the control logic unit U, it is preferable that said control logic unit U is configured to perform the step H of the method above mentioned.

In the embodiment being disclosed, said control logic unit U is connected to said optical interrogator machine M.

However, said control logic unit U can be also included in said optical interrogator machine M.

With reference to the first sealing device 21, said first sealing device 21 comprises a first channel 21A having an inlet and an outlet.

In particular, said first channel 21A is arranged along a first axis A1 inclined with respect to a transverse plane of said first sealing device 21 in such a way that said first channel 21A forms with the longitudinal axis $AL_1$ of the first sealing device itself a first angle $\alpha$.

Said first angle $\alpha$ can be between 5 e 45°, preferable 30°.

With reference to the second sealing device 22, said second sealing device 22 comprises a further first channel 22A having an inlet and an outlet.

In particular, said further first channel 22A is arranged along a second axis A2 inclined with respect to a second transverse plane of said second sealing device 22, different from said first transverse plane, in such a way that said further first channel 22A forms with the longitudinal axis $AL_2$ of the second sealing device itself a further first angle $\beta$.

Said further first angle $\beta$ can be between 5° and 45°, preferable 30°.

As shown in Figures, said first channel 21A and said further first channel 22A have an inclination equal to or substantially equal to, and opposite with respect to a transverse plane of the conduit.

In particular, with respect to a direction of the flow indicated with F, the first channel has an inclination decreasing with respect to said direction and the further first channel has an inclination increasing with respect to the same direction.

Said first channel has an inclination decreasing from the inlet to the outlet and said further first channel has an inclination increasing from the inlet to the outlet.

As above said, in the embodiment being disclosed, the first sealing device 21 and the second sealing device 22 comprise a respective first part and a respective second part, couplable with said first part and are provided with the respective sealing device 21, 22 on the conduit C.

In a variant, said first sealing device comprise a second channel 21B having an inlet and an outlet and second sealing device 22 comprise a further second channel 22B having an inlet and an outlet.

With reference to the second channel 21A of the first sealing device 21, said second channel 21B is arranged along a second axis A2 perpendicular or substantially perpendicular to the longitudinal axis $AL_1$ of the first sealing device 21 and forms with said first axis A1 of said first channel 21A a second angle θ.

In particular, said second axis A2 and said first axis A1 meet at one point inside the conduit C.

Said second angle θ can be between 45° and 85°.

With reference to the further second channel 22B of the second sealing device 22, said further second channel 22B is arranged along a further second axis A2' perpendicular and substantially perpendicular to the longitudinal axis $AL_2$ of the second sealing device 22 and forms with said further first axis A1' of said further first channel 22A a further second angle δ.

In particular, said further second axis A2' and said further first axis A1' meet at one point inside the conduit C.

Said further second angle δ can be between 45° and 85°.

With reference to the first positioning device 61, said first positioning device 61 is configured to be coupled with the inlet of the first channel 21A of the first sealing device and comprises:

a body 611 having a part configured to be coupled with the inlet of the first channel 21A of the first sealing device 21, a sealing element 612 arranged on said body 611, a hollow element 613, arranged at least partially inside said body 611 and sliding with respect to said body.

With reference to the second positioning device 62, said second positioning device 62 is configured to be coupled with the inlet of the further first channel 22A of the second sealing device 22 and comprises:

a body 621 having a part configured to be coupled with the inlet of the further first channel 22A of the second sealing device 22, a sealing element 622 arranged on said body 621, a hollow element 623, arranged at least partially inside said body 621 and sliding with respect to said body.

When the system is in use, the first positioning device 61 is coupled with the inlet of the first channel 21A of the first sealing device 21 and its hollow element 613 has a portion inside the first channel 21A of the first sealing device 21 and a further portion inside the conduit C.

Furthermore, when the system is in use, the second positioning device 62 is coupled with the inlet of the further first channel 22A of the second sealing device 22 and the hollow element 623 has a portion inside the further first channel 22A of the second sealing device 22 and a further portion inside the conduit C.

The hollow element 613 of the first positioning device 61 has a length such that it extends substantially from the inlet of the first channel 21A inside the conduit C until to an axis coincident or substantially coincident or parallel or substantially parallel to the longitudinal axis A of said conduit C and the hollow element 623 of the second positioning device 62 has a length such that it extends substantially from the inlet of the further first channel 22A inside the conduit C until to an axis coincident or substantially coincident or parallel or substantially parallel to the longitudinal axis A of said conduit C, in which said axis is inside the volume of water present in said conduit C, preferable in an intermediate position between the level of water and the bottom of the conduit C.

When the system is in use, the cable 1 extends from the inlet of the first channel 21A of the first sealing device 21 to the inlet of the further first channel 22A of the second sealing device 22.

In other words, the cable 1 enters the cavity of the hollow element 613 of the first positioning device 61, reaches the conduit C, and enters the cavity of the hollow element 623 of the second positioning device 62.

Furthermore, the system comprises a first blocking device 31 for blocking sliding of said cable 1 with respect to the first sealing device 21 and/or a second blocking device 32 for blocking sliding of said cable 1 with respect to the second sealing device 22.

Each blocking device 31,32 comprises a first supporting element for supporting a portion of said cable, and a second element, couplable with said first supporting element.

In the embodiment being disclosed, each blocking device comprises coupling means for coupling said second element with said first supporting element.

The first blocking device 31 is dimensioned and shaped in such a way as to abut against the first positioning device 61.

The second blocking device 32 is dimensioned and shaped in such a way as to abut against the second positioning device 62.

In the embodiment being disclosed, each blocking device 31,32 abuts to the sealing element 612,622 of the respective positioning device 61,62.

ADVANTAGES

Advantageously, by means of the method object of the present invention, it is possible to identify a leakage in a conduit in which a fluid flows as a function of the mechanical deformation of a cable comprising inside at least an optical fiber.

Furthermore, it is possible to obtain the position of such a leakage with respect to the conduit with high accuracy.

The present invention has been described for illustrative, but not limitative purposes, according to its preferred embodiments, but it is to be understood that variations and/or modifications can be carried out by a skilled in the art, without departing from the scope thereof, as defined according to enclosed claims.

The invention claimed is:

1. A method for identifying a leakage in a conduit in which a fluid flows, where said conduit includes a longitudinal axis, said method comprising:
A) providing a cable comprising inside at least one first optical fiber, where said cable comprises an inner surface and a longitudinal axis and said first optical fiber is integral with a portion of said inner surface of said cable,
B) arranging said cable tensioned inside said conduit so that the longitudinal axis of said cable is coincident or substantially coinciding or parallel or substantially parallel to the longitudinal axis of said conduit, in such a way that, in use, said cable is inside a fluid present in said conduit,
C) for each instant time $t_K$, with k=1, . . . , M where M is a positive integer and k is an index of a number of time instants, measuring a value of mechanical deformation at predetermined points $P_i$ of said cable, with $i=1, \ldots, N$ where N is a positive integer and i is an index of a number of said predetermined points, so as to obtain a succession of values of mechanical deformation $(D_i)_k$ for each of said predetermined points $P_i$ at each time instant $t_K$:
at a time instant $t_1$
$(D_1)_1, (D_2)_1 \ldots (D_N)_1$
at a time instant $t_2$
$(D_1)_2, (D_2)_2 \ldots (D_N)_2$
...
at a time instant $t_M$
$(D_1)_M, (D_2)_M \ldots (D_N)_M$, D) for each time instant $t_K$, calculating a difference between the value of mechanical deformation $(D_i)_k$ at the predetermined point $P_i$ of said cable and a respective predetermined reference value of mechanical deformation $D_{10}, D_{20} \ldots D_{N0}$ at the same predetermined point $P_i$, so as to obtain for each time instant $t_k$ a respective first succession of difference values $(\Delta D_i)_k$:
at the time instant $t_1$
$(\Delta D_1)_1, (\Delta D_2)_1 \ldots (\Delta D_N)_1$
where
$(\Delta D_1)_1 = (D_1)_1 - D_{10}$
$(\Delta D_2)_1 = (D_2)_1 - D_{20}$
...
$(\Delta D_N)_1 = (D_N)_1 - D_{N0}$
at the time instant $t_2$
$(\Delta D_1)_2, (\Delta D_2)_2 \ldots (\Delta D_N)_2$
where
$(\Delta D_1)_2 = (D_1)_2 - D_{10}$
$(\Delta D_2)_2 = (D_2)_2 - D_{20}$
...
$(\Delta D_N)_2 = (D_N)_2 - D_{N0}$
...
at the time instant $t_M$
$(\Delta D_1)_2, (\Delta D_2)_2 \ldots (\Delta D_N)_2$
where
$(\Delta D_1)_M = (D_1)_M - D_{10}$
$(\Delta D_2)_M = (D_2)_M - D_{20}$
...
$(\Delta D_N)_M = D_{NM} - D_{N0}$, E) for each time instant $t_K$, comparing each difference value of a respective succession of difference values $(\Delta D_i)_k$ with a subsequent difference value $(\Delta D_{i+1})_k$ of said respective succession of difference values, so as to obtain a respective second succession of difference values $\{\Delta(\Delta D_i)_k\}$:
at the time instant $t_1$
$\{\Delta(\Delta D_1)_1\}, \{\Delta(\Delta D_2)_1\} \ldots \{\Delta(\Delta D_N)_1\}$
where
$\{\Delta(\Delta D_1)_1\} = (\Delta D_1)_1 - (\Delta D_2)_1$,
$\{\Delta(\Delta D_2)_1\} = (\Delta D_2)_1 - (\Delta D_3)_1$,
$\{\Delta(\Delta D_3)_1\} = (\Delta D_3)_1 - (\Delta D_4)_1$,
...
$\{\Delta(\Delta D_N)_1\} = (\Delta D_{N-1})_1 - (\Delta D_N)_1$
at the time instant $t_2$
$\{\Delta(\Delta D_1)_2\}, \{\Delta(\Delta D_2)_2\} \ldots \{\Delta(\Delta D_N)_2\}$
where
$\{\Delta(\Delta D_1)_2\} = (\Delta D_1)_2 - (\Delta D_2)_2$,
$\{\Delta(\Delta D_2)_2\} = (\Delta D_2)_2 - (\Delta D_3)_2$,
$\{\Delta(\Delta D_3)_2\} = (\Delta D_3)_2 - (\Delta D_4)_2$,
...
$\{\Delta(\Delta D_N)_2\} = (\Delta D_{N-1})_2 - (\Delta D_N)_2$
...
at the time instant $t_M$
$\{\Delta(\Delta D_1)_M\}, \{\Delta(\Delta D_2)_M\} \ldots \{\Delta(\Delta D_N)_M\}$ where
$\{\Delta(\Delta D_1)_M\} = (\Delta D_1)_M - (\Delta D_2)_M$,
$\{\Delta(\Delta D_2)_M\} = (\Delta D_2)_M - (\Delta D_3)_M$,
$\{\Delta(\Delta D_3)_M\} = (\Delta D_3)_M - (\Delta D_4)_M$,
...
$\{\Delta(\Delta D_N)_M\} = (\Delta D_{N-1})_M - (\Delta D_N)_M$ F) for each time instant $t_K$, verifying if a difference value $\{\Delta(\Delta D_i)_K\}$ of each second succession of difference values is greater than 0 for determining if an amount of fluid comes out from said conduit between two predetermined points of said conduit, and G) for each couple of predetermined points of said cable at the difference value $\{\Delta(\Delta D_i)_K\}$ of each second succession is greater than 0, in order to determine if said amount of fluid comes out from said conduit due to leakage, verifying:
when a value of mechanical deformation $(\Delta D_i)_{k+1}$ at a time instant $t_{K+1}$ is equal to the value of the mechanical deformation $(\Delta D_i)_k$ at a time instant $t_K$, if the value of difference between the difference value $\{\Delta(\Delta D_i)_K\}$ between two predetermined points at the time instant $t_K$ and the difference value $\{\Delta(\Delta D_i)_{K+1}\}$ between the same predetermined points at the time instant $t_{K+1}$ is less than or equal to 0, and
when the value of mechanical deformation $(\Delta D_i)_{k+1}$ at the time instant $t_{K+1}$ is different from the value of mechanical deformation $(\Delta D_i)_k$ at the time instant $t_K$, if the value of the difference between the difference value $\{\Delta(\Delta D_i)_K$ between two predetermined points at the time instant K and the difference value $\{\Delta(\Delta D_i)_{K+1}$ between the same predetermined points at the time instant K+1 multiplied for a ratio between the value of mechanical deformation $(\Delta D_i)_k$ at the time $t_K$ and the value of mechanical deformation $(\Delta D_i)_{k+1}$ at the time instant $t_{K+1}$ is less than or equal to 0.

2. The method according to claim 1, further comprising:
H) calculating a distance between a couple of predetermined points of said cable at the difference value $\{\Delta(\Delta D_i)_K\}$ is greater than 0 and a further couple of predetermined points of said cable at the difference value $\{\Delta(\Delta D_i)_K\}$ is lower than or equal to 0, where said further couple of predetermined points is arranged in succession to said couple of predetermined points, in order to identify a position of said leakage with respect to a length of the conduit.

3. The method according to claim 2, further comprising:
for each time instant $t_K$, verifying if the difference value $\{\Delta(\Delta D_i)_k\}$ of each second succession of difference values is equal to 0,
if the difference value $\{\Delta(\Delta D_i)_K$ is equal to 0, verifying if at different time instant $t_k$, the value of the difference between the difference value $(\Delta D_i)_K$ at a predetermined point $P_i$ of the cable at the time instant $t_K$ and the difference value $(\Delta D_i)_{K+1}$ in correspondence to same predetermined point $P_i$ at time instant $t_{K+1}$ is different from 0, for determining a change of speed of the fluid between two subsequent time instants referred to a predetermined point $P_i$ of said conduit.

4. The method according to claim 3, wherein said cable comprises inside a second optical fiber that is arranged inside a hollow element, and the method further comprises:
measuring a temperature at each of said predetermined point $P_i$.

5. The method according to claim 1, where, in order to obtain a better spatial resolution referred to a position of each predetermined point $P_i$ of the cable, said cable comprises inside a second optical fiber, where an end of said second optical fiber is connected to an end of said first optical fiber.

6. The method according to claim 5, wherein said second optical fiber is arranged inside a hollow element, where said hollow element is arranged inside said cable, and the method further comprises:
measuring a temperature at each of said predetermined point $P_i$.

7. The method according to claim 1, wherein said fluid is water, oil or gas.

8. A system for identifying the leakage in a conduit in which a fluid flows, the system comprising:
a cable comprising inside at least one first optical fiber, where said cable comprises an inner surface and a longitudinal axis and said first optical fiber is integral with a portion of said inner surface of said cable;
an optical interrogator machine for interrogating said at least one first optical fiber, where said optical interrogator machine is provided with at least one input for receiving an end of said cable;
a control logic unit configured to perform the steps C to G of the method according to claim 1;
a first sealing device with a longitudinal axis and shaped to be adapted to the conduit in such a way that, in use, said first sealing device is positioned around a first portion of said conduit and its longitudinal axis is coincident or substantially coincident with the longitudinal axis of said conduit;
a second sealing device with a longitudinal axis and shaped to be adapted to the conduit, in such a way that, in use, said second sealing device is positioned around a second portion of said conduit, spaced from said first portion, and its longitudinal axis is coincident or substantially coincident with the longitudinal axis of said conduit; and
a first positioning device and a second positioning device for positioning said cable inside said conduit,
wherein
said first sealing device comprises a first channel for passage of at least a cable, said first channel including an inlet and an outlet and being arranged around a first axis inclined with respect to a first transverse plane of said first sealing device in such a way that said first channel forms with the longitudinal axis of said first sealing device a first angle between 5° and 45°,
said second sealing device comprises a further first channel for passage of at least a cable, said further first channel including an inlet and an outlet and being arranged around a further first axis inclined with respect to a second transverse plane of said second sealing device, different from said first transverse plane, in such a way that said further first channel forms with the longitudinal axis of said second sealing device a further first angle between 5° and 45°,
said first channel and said further first channel have an inclination equal or substantially equal and opposite with respect to a transverse plane of said conduit,
each positioning device comprises:
a respective body including a respective part configured to be coupled respectively to the inlet of the first channel of the first sealing device and to the inlet of the further first channel of the second sealing device,
a respective sealing element arranged on the respective body,
a hollow element arranged at least partially inside the respective body and sliding with respect to said body, and
the hollow element of the first positioning device has a length such that, in use, substantially extends from the inlet of the first channel of the first sealing device inside the conduit, up to an axis being coincident or substantially coincident with or parallel or substantially parallel to the longitudinal axis of said conduit, and the hollow element of the second positioning device has a length such that, in use, substantially extends from the inlet of the further first channel of the second sealing device inside the conduit, up to an axis coincident or substantially coincident or parallel or substantially parallel to the longitudinal of said conduit.

9. The system according to claim 8, wherein said control logic unit is further configured to:
calculate a distance between a couple of predetermined points of said cable at the difference value $\{\Delta(\Delta D_i)_K\}$ is greater than 0 and a further couple of predetermined points of said cable at the difference value $\{\Delta(\Delta D_i)_K\}$ is lower than or equal to 0, where said further couple of predetermined points is arranged in succession to said couple of predetermined points, in order to identify the position of said leakage with respect to the length of the conduit.

10. The system according to claim 8,
said first sealing device comprises a second channel, where said second channel includes an inlet and an outlet and is arranged around a second axis perpendicular or substantially perpendicular to the longitudinal axis of the first sealing device and forms with said first axis of said first channel a second angle between 45° and 85°, and
said second sealing device comprises a further second channel, where said further second channel includes an inlet and an outlet and is arranged around a further second axis perpendicular or substantially perpendicular to the longitudinal axis of the second sealing device and forms with said second axis of said second channel a third angle between 45° and 85°.

11. The system according to claim 8, wherein said first sealing device and said second sealing device comprise a respective first part and a respective second part, couplable with said first part.

12. The system according to claim 8, wherein:
said first sealing device is provided with first clamping means for clamping said first sealing device on the conduit, and
said second sealing device is provided with second clamping means clamping said second sealing device on the conduit.

13. The system according to claim 8, further comprising at least one of:
a first blocking device for preventing the cable from sliding with respect to the sealing element of the first positioning device, where said first blocking device is dimensioned and shaped in a such a way to abut to the first positioning device, or
a second blocking device for preventing the cable from sliding with respect to the sealing element of the second positioning device, where said second blocking device is dimensioned and shaped in a such a way to abut against the second positioning device.

14. The system according to claim 8, wherein said cable comprises inside a second optical fiber including an end connected to an end of said first optical fiber.

15. The system according to claim 14, wherein said second optical fiber is arranged inside a hollow element.

16. The system according to claim 8, wherein said cable comprises inside a second optical fiber that is arranged inside a hollow element.

\* \* \* \* \*